(12) United States Patent
Lin et al.

(10) Patent No.: US 11,815,765 B2
(45) Date of Patent: Nov. 14, 2023

(54) DISPLAY PANEL AND DISPLAY DEVICE

(71) Applicant: Xiamen Tianma Micro-Electronics Co., Ltd., Xiamen (CN)

(72) Inventors: Shaoting Lin, Xiamen (CN); Zhixing Liang, Xiamen (CN); Caijiao Zhong, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 18/050,680

(22) Filed: Oct. 28, 2022

(65) Prior Publication Data

US 2023/0152628 A1 May 18, 2023

(30) Foreign Application Priority Data

Jul. 20, 2022 (CN) .............................. 202210857594

(51) Int. Cl.
*G02F 1/13357* (2006.01)
*G02F 1/1335* (2006.01)

(52) U.S. Cl.
CPC .. *G02F 1/133608* (2013.01); *G02F 1/133548* (2021.01); *G02F 1/133603* (2013.01); *G02F 1/133605* (2013.01); *G02F 1/133606* (2013.01); *G02F 1/133612* (2021.01)

(58) Field of Classification Search
CPC .... H10K 59/50; H10K 59/771; H10K 59/128; G02F 1/133612; G02F 1/133603; G02F 1/1336–133613
See application file for complete search history.

(56) References Cited

U.S. PATENT DOCUMENTS

2018/0275462 A1* 9/2018 Li ........................... H01L 33/06
2021/0397054 A1* 12/2021 Zhong ............... G02F 1/133603

FOREIGN PATENT DOCUMENTS

| CN | 205452331 U | 8/2016 |
| CN | 109712968 A | 5/2019 |
| CN | 111781772 A | 10/2020 |
| CN | 112331642 A | 2/2021 |

\* cited by examiner

*Primary Examiner* — Mariceli Santiago
(74) *Attorney, Agent, or Firm* — CHRISTENSEN O'CONNOR JOHNSON KINDNESS PLLC

(57) ABSTRACT

Provided are a display panel and a method for manufacturing the display panel, and a display device and a method for manufacturing the display device. Various embodiments relate to the field of display technology and can reduce the thickness of the display panel. The display panel includes a base, a display driving circuit provided at a first side of the base, and a backlight driving circuit provided at a second side of the base. The display driving circuit includes a first thin film transistor. The backlight driving circuit includes a second thin film transistor, and is configured to drive the backlight source to emit light.

20 Claims, 13 Drawing Sheets

Form a carrier layer at a side of the backlight driving circuit away from the base — S51

Form a through-hole running through the carrier layer — S52

DISPLAY PANEL AND DISPLAY DEVICE

CROSS-REFERENCE TO RELATED APPLICATIONS

The present application claims priority to Chinese Patent Application No. 202210857594.2, filed on Jul. 20, 2022, the content of which is incorporated herein by reference in its entirety.

TECHNICAL FIELD

The present disclosure relates to the field of display technology, and in particular, to a display panel, a method for manufacturing the display panel, a display device, and a method for manufacturing the display device.

BACKGROUND

With the development of display technology, flat display devices such as a liquid crystal display (LCD) panel have the advantages of high quality, power saving and wide application range, and thus are widely used in various electronic products such as in mobile phones, TVs, digital cameras, notebooks. Flat display devices have become the mainstream of display devices. However, the existing display panel has the problems of large thickness and excessive weight.

SUMMARY

In view of this, embodiments of the present disclosure provide a display panel, a method for manufacturing the display panel, a display device, and a method for manufacturing the display device, for reducing the thickness of the display panel and reducing the weight of the display panel.

In a first aspect, an embodiment of the present disclosure provides a display panel including a base having a first side and a second side oppositely arranged along a thickness direction of the base, a display driving circuit located at the first side of the base, and a backlight driving circuit located at the second side of the base. The display driving circuit includes a first thin film transistor. The backlight driving circuit is configured to drive the backlight source to emit light; and includes a second thin film transistor.

In a second aspect, an embodiment of the present disclosure provides a display device, including: a backlight source, a reflective layer and the display panel described above. The backlight source includes a light-emitting element, and the light-emitting element is electrically connected to the backlight driving circuit. A light-exiting surface of the light-emitting element is located at a side of the light-emitting element away from the base. The reflective layer is located at the side of the light-emitting element away from the base.

In a third aspect, an embodiment of the present disclosure provides a method for manufacturing a display panel. The display panel includes an array substrate, and the method for manufacturing the array substrate includes: providing a base, the base having a first side and a second side disposed oppositely along a thickness direction of the base; forming a display driving circuit at the first side of the base, the display driving circuit including a first thin film transistor; forming a backlight driving circuit at the second side of the base to obtain the array substrate including the backlight driving circuit, the display driving circuit and the base. The backlight driving circuit is configured to drive a backlight source to emit light, and includes a second thin film transistor.

In a fourth aspect, an embodiment of the present disclosure provides a method for manufacturing a display device, and the method includes: providing an array substrate manufactured by the method in the third aspect and a color filter substrate; cell-assembling the color filter substrate and the array substrate to obtain a display motherboard; cutting the display motherboard to obtain a display panel; and forming the backlight source at a side of the backlight driving circuit in the display panel away from the base to obtain the display device. The backlight source includes a light-emitting element, and the light-emitting element is electrically connected to the backlight driving circuit.

BRIEF DESCRIPTION OF DRAWINGS

In order to better illustrate technical solutions in embodiments of the present disclosure, the accompanying drawings used in the embodiments and in the related art are briefly introduced as follows. It should be noted that the drawings described as follows are merely part of the embodiments of the present disclosure, and other drawings can also be acquired by those skilled in the art.

DESCRIPTION OF EMBODIMENTS

For better illustrating technical solutions of the present disclosure, embodiments of the present disclosure will be described in detail as follows with reference to the accompanying drawings.

It should be noted that, the described embodiments are merely exemplary embodiments of the present disclosure, which shall not be interpreted as providing limitations to the present disclosure. All other embodiments obtained by those skilled in the art according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there may be three relationships, for example, A and/or B may indicate that three cases, i.e., A existing individually, A and B existing simultaneously, B existing individually. In addition, the character "/" herein generally indicates that the related objects before and after the character form an "or" relationship.

It should be understood that although the thin film transistor may be described using the terms of "first", "second", etc., in the embodiments of the present disclosure, the thin film transistor will not be limited to these terms. These terms are merely used to distinguish thin film transistors from one another. For example, without departing from the scope of the embodiments of the present disclosure, a first thin film transistor may also be referred to as a second thin film transistor, similarly, a second thin film transistor may also be referred to as a first thin film transistor.

Figure 1:
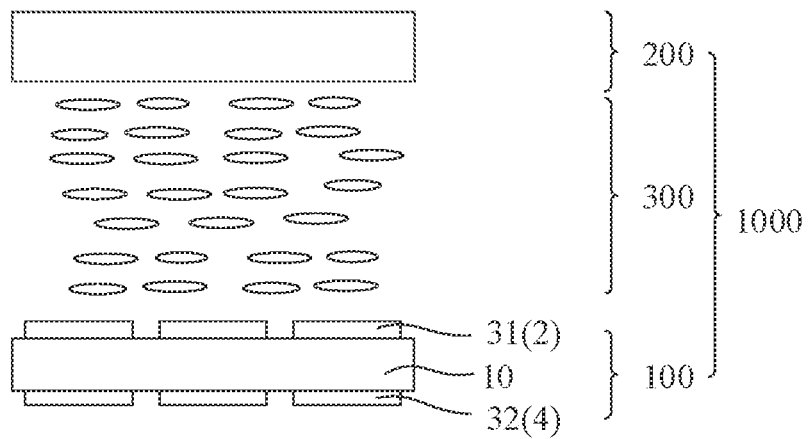
FIG. 1 is a schematic cross-sectional view of a display panel according to an embodiment of the present disclosure.

An embodiment of the present disclosure provides a display panel. As shown in FIG. 1, which is a schematic cross-sectional view of a display panel according to an embodiment of the present disclosure, the display panel 1000 includes an array substrate 100 and a color filter substrate 200 that are opposite to each other, and a liquid crystal layer 300 located between the array substrate 100 and the color filter substrate 200.

As shown in FIG. 1, the array substrate 100 includes a base 10, and the base 10 includes a first side and a second side that are opposite to each other in a thickness direction of the base 10. For example, the first side of the base 10 refers to a side adjacent to the color filter substrate 200, and the second side of the base 10 refers to a side away from the color filter substrate 200. As shown in FIG. 1, a display driving circuit 2 is provided at the first side of the base 10, and the display driving circuit 2 includes a first thin film transistor 31.

Figure 2:
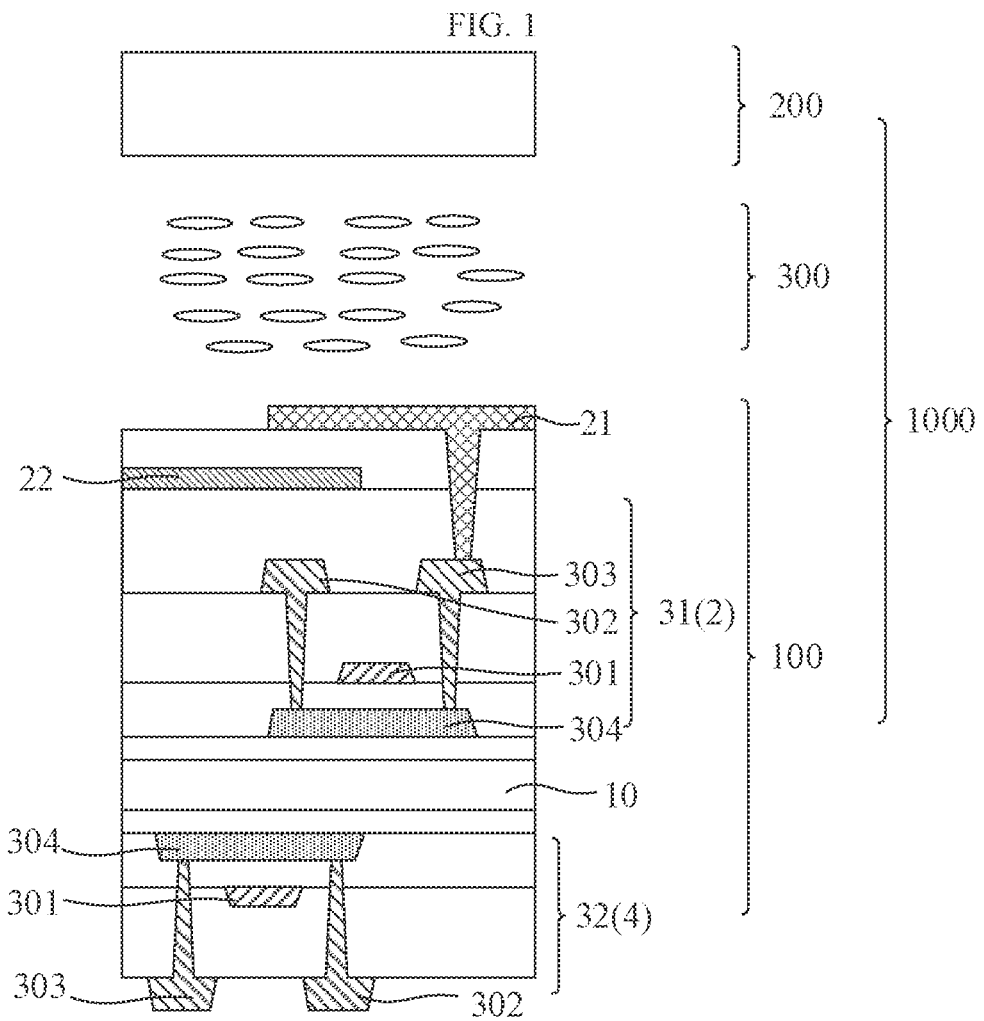
FIG. 2 is a schematic cross-sectional view of another display panel according to an embodiment of the present disclosure.

FIG. 2 is a schematic cross-sectional view of another display panel according to an embodiment of the present disclosure. For example, as shown in FIG. 1 and FIG. 2, the display panel 1000 further includes a pixel electrode 21 and a common electrode 22, and the pixel electrode 21 is located at a side of the display driving circuit 2 away from the base 10. The first thin film transistor 31 in the display driving circuit 2 is electrically connected to the pixel electrode 21. The display driving circuit 2 is configured to supply an electrical signal to the pixel electrode 21. The liquid crystal layer 300 is deflected under an action of a voltage difference between the pixel electrode 21 and the common electrode 22.

As shown in FIG. 1 and FIG. 2, a backlight driving circuit 4 is provided at the second side of the base 10, and the backlight driving circuit 4 is configured to drive a backlight source (not shown in FIG. 1 and FIG. 2) to emit light. For example, the backlight driving circuit 4 includes a second thin film transistor 32. The first thin film transistor 31 and the second thin film transistor 32 each include a gate electrode 301, a source electrode 302, a drain electrode 303 and a semiconductor layer 304. It should be noted that a structure of the first thin film transistor 31 and a structure of the second thin film transistor 32 shown in FIG. 2 are merely illustrative. In some embodiments of the present disclosure, the structure of the first thin film transistor 31 may be the same as the structure of the second thin film transistor 32. For example, both the first thin film transistor 31 and the second thin film transistor 32 are arranged in a gate-top structure or a gate-bottom structure. Alternatively, the structure of the first thin film transistor 31 may be different from the structure of the second thin film transistor 32, for example, one of the first thin film transistor 31 and the second thin film transistor 32 has a gate-top structure, and the other one of the first thin film transistor 31 and the second thin film transistor 32 has a gate-bottom structure. The present disclosure does not limit this.

It should be noted that positions of the pixel electrode 21 and the common electrode 22 shown in FIG. 2 are merely illustrative. In some embodiments of the present disclosure, the positions of the pixel electrode 21 and the common electrode 22 in the display panel 1000 can be adjusted according to different design requirements. The present disclosure does not limit this. For example, the common electrode 22 may be arranged at a side of the pixel electrode 21 adjacent to the liquid crystal layer 300, or the common electrode 22 and the pixel electrode 21 can be arranged at two opposite sides of the liquid crystal layer 300, respectively.

When the display panel 1000 works, the backlight driving circuit 4 drives the backlight source (not shown in FIG. 1 and FIG. 2) to emit light, and the light emitted from the backlight source is directed to the liquid crystal layer 300 in the display panel 1000. The liquid crystal layer 300 is deflected under control of the display driving circuit 2, thereby modulating the light emitted from the backlight source, so that the sub-pixels at the corresponding positions in the display panel function within a target gray scale.

In the display panel 1000 provided by some embodiments of the present disclosure, the display driving circuit 2 and the backlight driving circuit 4 are provided at the first side and the second side of the base 10 respectively, therefore, there is no need to provide different carrier substrates for the display driving circuit 2 and the backlight driving circuit 4 respectively, which is beneficial to reducing the thickness of the display panel 1000 and reducing the weight of the display panel 1000.

Figure 3:
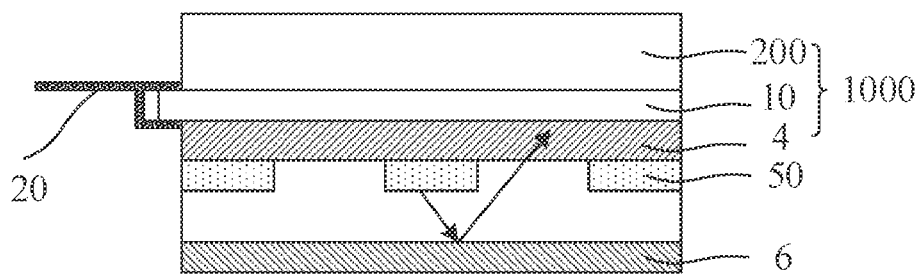
FIG. 3 is a schematic cross-sectional view of a display device according to an embodiment of the present disclosure.

Some embodiments of the present disclosure further provide a display device. As shown in FIG. 3, which is a schematic cross-sectional view of a display device according to an embodiment of the present disclosure, the display device includes a backlight source, a reflective layer 6 and the display panel 1000 described above. The backlight source is located at a side of the backlight driving circuit 4 away from the base 10. The backlight source includes a light-emitting element 50. For example, the light-emitting element 50 includes a mini light-emitting diode (Mini LED), and the mini LED has a size about 200 μm, which is one-fifth of a conventional LED. Using the mini LED as the backlight source, more light-emitting elements can be arranged within the display device, which is beneficial for achieving precise light adjustment and for improving the overall brightness of the display device. The light-emitting element 50 and the backlight driving circuit 4 in the display panel 1000 are electrically connected to each other. In some embodiments of the present disclosure, a light-exiting surface of the light-emitting element 50 is located at a side of the light-emitting element 50 away from the backlight driving circuit 4.

As shown in FIG. 3, the reflective layer 6 is located at a side of the light-emitting element 50 away from the base 10. For example, as shown in FIG. 3, in some embodiments of the present disclosure, an orthographic projection of the reflective layer 6 onto a plane of the light-emitting element 50 can cover the light-emitting element 50, and the orthographic projection of the reflective layer 6 onto the plane of the light-emitting element 50 can cover a gap between two adjacent light-emitting elements 50. For example, a material of the reflective layer 6 includes silver, aluminum or other material with higher reflectivity.

When the display device works, the light-emitting element 50 emits light. The light emitted from the light-emitting element 50 is directed to the reflective layer 6 and then reflected by the reflective layer 6. As shown in FIG. 3, the light reflected by the reflective layer 6 is directed to a light-exiting side of the display panel 1000. After being modulated by the liquid crystal layer of the display panel 1000, each pixel in the display device is lit with a target gray scale.

Figure 4:
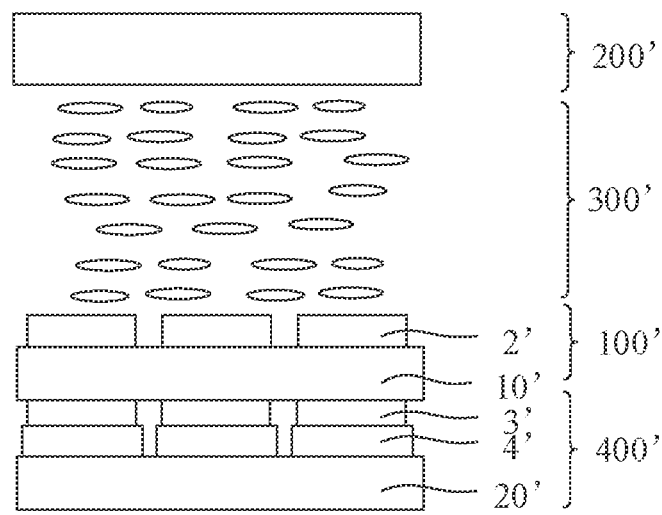
FIG. 4 is a schematic cross-sectional view of a display device in the related art.

In the display device provided by the embodiments of the present disclosure, the display driving circuit 2 and the backlight driving circuit 4 are provided at the first side and the second side of the substrate 10 of the display panel 1000 respectively, therefore, there is no need to provide different carrier substrates for the display driving circuit 2 and the backlight driving circuit 4 respectively. FIG. 4 is a schematic cross-sectional view of a conventional display device. The display device includes an array substrate 100', a color filter substrate 200', a liquid crystal layer 300' and a backlight module 400'. The array substrate 100' includes a first base 10' and a display driving circuit 2'. The backlight module 400' includes a second base 20', a backlight driving circuit 4', and a backlight source 3'. In the conventional display device in FIG. 4, the backlight source 3' and the backlight driving circuit 4' need to be formed on the second base 20' to obtain the backlight module 400', and then the backlight module 400' is attached to a side of the array substrate 100' away from the liquid crystal layer 300'. In this case, not only the process thereof is complicated, but also the overall thickness of the display device is too large since the thicknesses of the first base 10' and the thickness of the second base 20' are both large. According to the technical solutions in the embodiments of the present disclosure, the first base is reused as the carrier substrate for carrying the backlight driving circuit 4', therefore, there is no need to additionally provide the second base 20', which is beneficial to reducing the thickness of the display device and reducing the weight of the display device, thereby reducing the cost of the display device and realizing thinness and lightness of the terminal product. Moreover, according to the technical solutions in the embodiments of the present disclosure, the alignment and attachment operation for the display driving circuit 2 and the backlight driving circuit 4 can be omitted, which is beneficial for simplifying the process for manufacturing the display device.

In addition, in the embodiments of the present disclosure, the light-exiting surface of the light-emitting element 50 is arranged at a side of the light-emitting element 50 away from the base 10, and the reflective layer 6 is arranged at the side of the light-emitting element 50 away from the base 10, so that electrical connection of the light-emitting element 50 and the backlight driving circuit 4 that is located at the second side of the base 10 can be achieved, and the light emitted from the light-emitting element 50 can be normally directed to the side where the light-exiting surface of the display panel 1000 is located, thereby ensuring the normal display of the display device.

In an example shown in FIG. 3, the display device further includes a flexible printed circuit (FPC) 20, and the flexible printed circuit 20 is electrically connected to the backlight driving circuit 4 and the display driving circuit (not shown in FIG. 3), respectively. When the display device works, an external control circuit transmits an electrical signal to the backlight driving circuit 4 and the display driving circuit through the flexible printed circuit 20.

Figure 5:
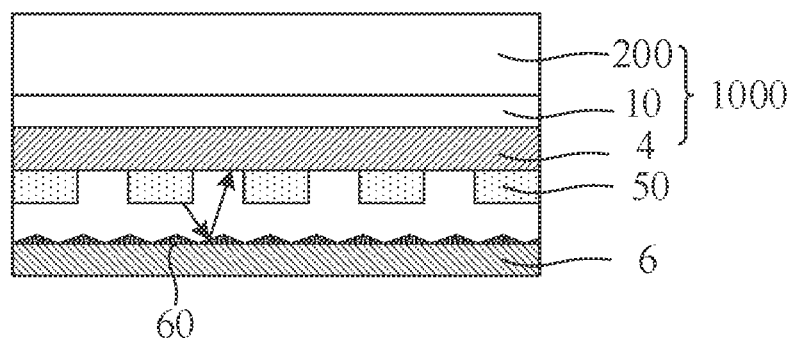
FIG. 5 is a schematic cross-sectional view of another display device according to an embodiment of the present disclosure.

FIG. 5 is a schematic cross-sectional view of another display device according to an embodiment of the present disclosure. In an example shown in FIG. 5, a plurality of microstructures 60 is provided at a side of the reflective layer 6 adjacent to the light-emitting element 50. The light emitted from the light-emitting element 50 is directed to the microstructure 60 and then diffusely reflected at a surface of the microstructure 60, so that the light directed to the light-exiting surface of the display panel 1000 can be more uniform. It should be noted that a shape of the microstructure 60 shown in FIG. 5 is merely illustrative. In the embodiments of the present disclosure, the shape of the microstructure 60 may be a triangular pyramid or a hemisphere, or other shape. The present disclosure does not limit this feature.

Figure 6:
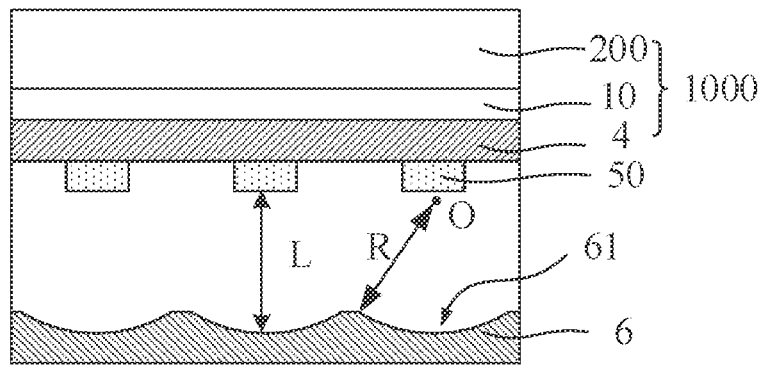
FIG. 6 is a schematic cross-sectional view of yet another display device according to an embodiment of the present disclosure.

FIG. 6 is a schematic cross-sectional view of another display device according to an embodiment of the present disclosure. In an embodiment shown in FIG. 6, a reflective bowl 61 is provided at a side of the reflective layer 6 adjacent to the light-emitting element 50. The reflective bowl 61 has a recessed structure which is recessed towards a direction away from the light-emitting element 50. The light emitted from the light-emitting element 50 can be reflected by the reflective bowl 61 after being directed to the reflective bowl 61. The design of the reflective bowl 61 can make the reflected light diffuse in a variety of different propagation directions between the light-emitting element 50 and the reflective bowl 61, which is beneficial to making the reflected light avoid a position of the light-emitting element 50 is located, thereby avoiding that the light-emitting element 50 blocks propagation of the reflected light. Moreover, the light reflected by the reflective bowl 61 has a wide propagation range, which can improve the uniformity of the brightness of the light directed to the display panel 1000 at different positions.

When designing the reflective bowl 61, exemplarily, as shown in FIG. 6, in the embodiments of the present disclosure, the light-emitting element 50 can be arranged correspondingly to a bottom of the reflective bowl 61. As shown in FIG. 6, along a direction perpendicular to a plane of the display panel 1000, a distance between the light-emitting element 50 and the reflective bowl 61 is L, a curvature radius of the reflective bowl 61 is R, and R<L. A point O shown in FIG. 6 represents a center of a sphere where the reflective bowl 61 is located. With such a configuration, on the one hand, it can ensure that there is an enough distance between the reflective bowl 61 and the light-emitting element 50; and on the other hand, it can avoid an excessive curvature radius R of the reflective bowl 61. After the light emitted from the light-emitting element 50 is reflected by the reflective bowl 61, the reflected light can be prevented from being confined in the space enclosed by the reflective bowl 61, so that the reflected light can be directed to the display panel 1000 as much as possible, thereby improving the utilization of light.

Figure 7:
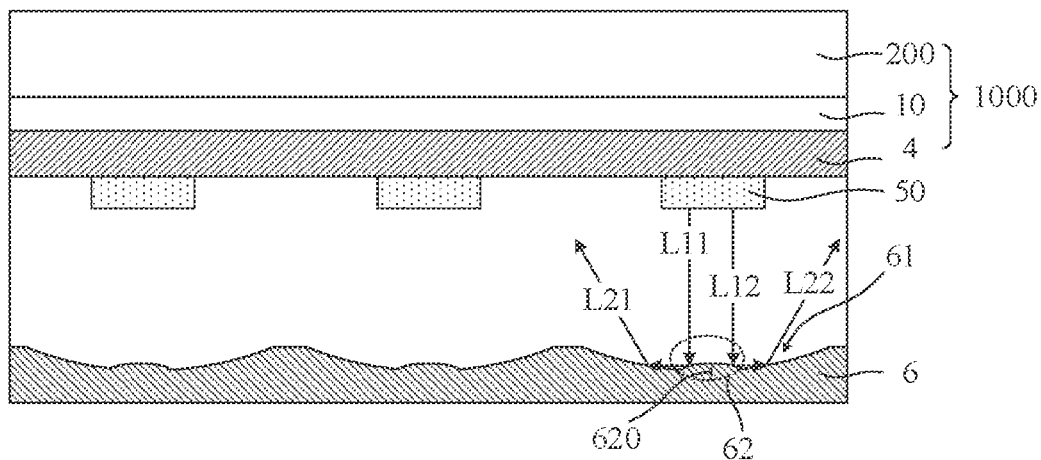
FIG. 7 is a schematic cross-sectional view of yet another display device according to an embodiment of the present disclosure.

FIG. 7 is a schematic cross-sectional view of another display device according to an embodiment of the present disclosure. In an embodiment shown in FIG. 7, the display device further includes a convex lens 62, and the convex lens 62 is located at a side of the reflective bowl 61 adjacent to the base 10. The combination configuration of the convex lens 62 and the reflective bowl 61 enables the small-angle light emitted from the light-emitting element 50 to avoid the position of the light-emitting element 50 is located after being reflected. The small-angle light refers to the light emitted from the light-emitting element 50 that propagates in a direction adjacent to the normal of the display panel 1000.

In an example, as shown in FIG. 7, a main optical axis 620 of the convex lens 62 corresponds to a center of the reflective bowl 61, and both correspond to a center of the light-exiting surface of the light-emitting element 50. The center of the reflective bowl 61 is a center of an orthographic projection of the reflective bowl 61 onto a plane of the reflective layer 6. As shown in FIG. 7, taking the first light L11 and the second light L12 emitted from the light-emitting element 50 as an example, the first light L11 and the second light L12 are symmetrical with respect to a symmetry axis passing the center of the light-exiting surface of the light-emitting element 50. The first light L11 is reflected by the convex lens 62 and the reflective bowl 61 to form the first reflected light L21, and the second light L12 is reflected by the convex lens 62 and the reflective bowl 61 to form the second reflected light L22. Both the first reflected light L21 and the second reflected light L22 can avoid the light-emitting element 50. Moreover, in the embodiments of the present disclosure, the main optical axis 620 of the convex lens 62 corresponds to the center of the reflective bowl 61, and both of the two correspond to the center of the light-exiting surface of the light-emitting element 50, so that the first reflected light L21 and the second reflected light L22 directed to the light-exiting surface of the display panel 1000 can also be symmetrical with respect to a symmetry axis passing a center of the light-exiting surface of the light-emitting element 50. Such a configuration can make the light directed to the light-exiting surface of the display panel 1000 more even.

Figure 8:
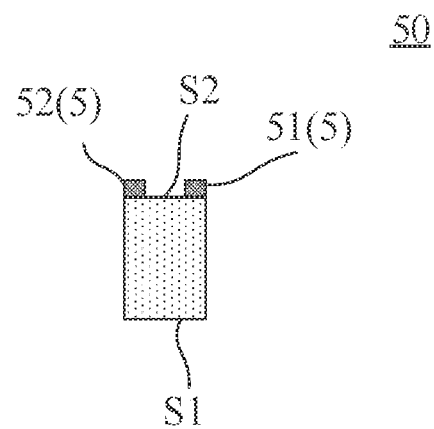
FIG. 8 is a schematic cross-sectional view of a light-emitting element according to an embodiment of the present disclosure.

FIG. 8 is a schematic cross-sectional view of a light-emitting element according to an embodiment of the present disclosure. Exemplarily, as shown in FIG. 8, the light-emitting element 50 has a light-exiting surface S1 and an electrode connection surface S2. Exemplarily, the light-emitting element 50 may include a plurality of light-exiting surfaces S1, and lights exit from the plurality of light-exiting surfaces S1 have different intensities. Unless otherwise specified below, the light-exiting surface S1 of the light-emitting element 50 refers to the surface of the light-emitting element 50 with the largest light-exiting intensity. Taking the light-emitting element 50 with a rectangular cross-section as shown in FIG. 8 as an example, the light-exiting surface S1 of the light-emitting element 50 refers to a surface arranged opposite from the electrode connecting surface S2.

At least one connection electrode 5 is provided at the electrode connection surface S2 of the light-emitting element 50. Exemplarily, as shown in FIG. 8, the at least one connection electrode 5 includes a first connection electrode 51 and a second connection electrode 52. The light-emitting element 50 is electrically connected to the backlight driving circuit through the first connection electrode 51 and the second connection electrode 52, to receive a driving signal provided by the backlight driving circuit.

Exemplarily, in a case where the light-emitting element 50 is provided in the display device, in some embodiments of the present disclosure, a non-zero angle is formed between the light-exiting surface 51 of the light-emitting element 50 and the reflective layer 6, so that the light emitted from the light-emitting element 50 and reflected by the reflective layer 6 can avoid the light-emitting element 50, thereby avoiding that the light-emitting element 50 blocks the light directed to the display panel 1000.

Figure 9:
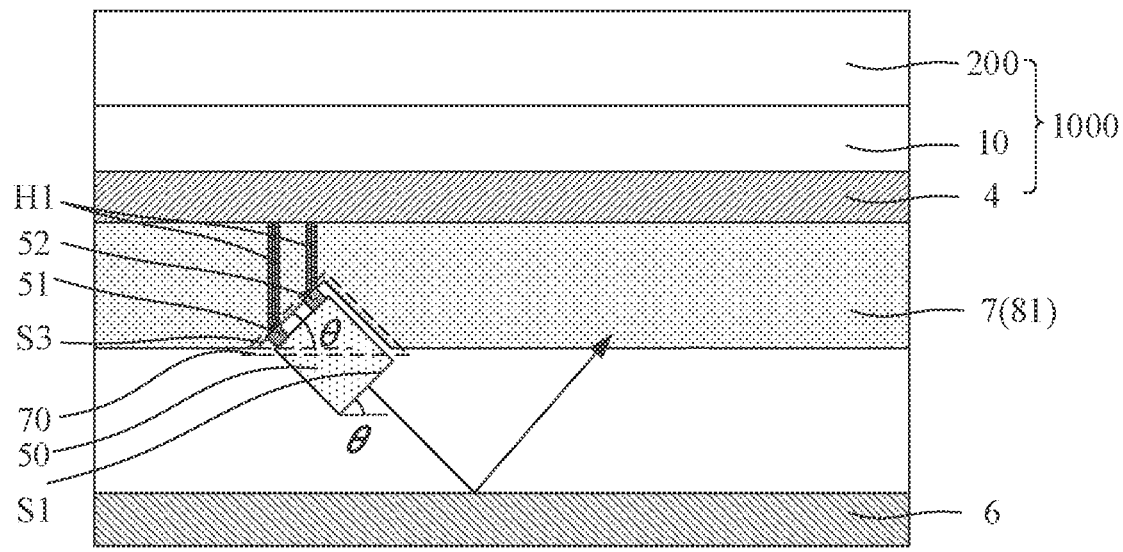
FIG. 9 is a schematic cross-sectional view of yet another display device according to an embodiment of the present disclosure.
Figure 10:
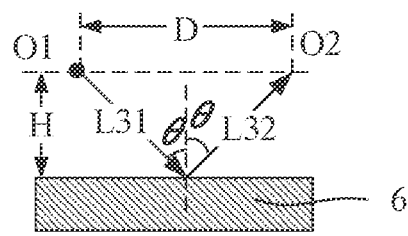
FIG. 10 is a schematic diagram of a light path of light that is emitted from the light-emitting element, propagates along a direction perpendicular to the light-exiting surface of the light-emitting element, and is reflected by the reflective layer.

In an embodiment shown in FIG. 9, which is a schematic cross-sectional view of another display device according to an embodiment of the present disclosure, an angle θ is formed between the light-exiting surface 51 of the light-emitting element 50 and the plane of the reflective layer 6, and 0°<θ<90°. With such a configuration, the light emitted from the light-emitting element 50 and reflected by the reflective layer 6 can avoid the light-emitting element 50. In an example, as shown in FIG. 9, the light emitted from the light-emitting element propagates along a direction perpendicular to the light-exiting surface S1 of the light-emitting element 50. FIG. 10 is a schematic diagram of a light path of light that is emitted from the light-emitting element, propagates along a direction perpendicular to the light-exiting surface of the light-emitting element, and is reflected by the reflective layer. In combination with FIG. 10, the light-emitting element 50 show in FIG. 9 can be equivalent to a point light source O1 shown in FIG. 10, and the light L31 is light that propagates along a direction perpendicular to the light-exiting surface S1 of the light-emitting element 50 shown in FIG. 10. In the embodiments of the present disclosure, an angle formed between the light-exiting surface S1 of the light-emitting element 50 and the plane of the reflective layer 6 is equal to 0. Therefore, an incident angle of the light L31 directed to the reflective layer 6 is also equal to 0. Correspondingly, a reflection angle of the reflected light L32 reflected by the reflective layer 6 is also equal to θ. According to the triangular geometric relationship, when the reflected light L32 is incident to the plane of the point light source O1, a distance D between the reflected light L32 and the point light source O1 satisfies: D=2H tan θ. Therefore, when H>0 and 0<θ<90°, D>0. That is, the reflected light L32 can avoid the light-emitting element 50 corresponding to the point light source O1.

Exemplarily, θ≤30°, so that an angle formed between the light-exiting surface S1 of the light-emitting element 50 and the plane of the reflective layer 6 is not too large, which is beneficial to improving the intensity of the light emitted from the light-exiting surface S1 of the light-emitting element 50 and received by the reflective layer 6, thereby avoiding waste of the light emitted from the light-emitting element 50.

Exemplarily, as shown in FIG. 9, the display device further includes a carrier layer 7 located between the light-emitting element 50 and the backlight driving circuit 4, and the carrier layer 7 includes a recessed portion 70 located at a side of the carrier layer 7 away from the backlight driving circuit 4.

Figure 11:
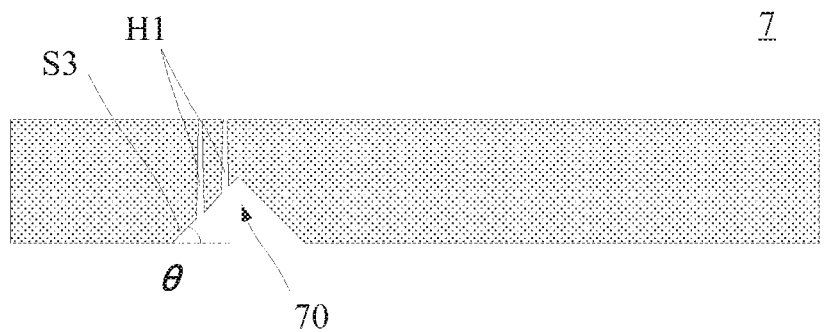
FIG. 11 is a schematic cross-sectional view of a carrier layer according to an embodiment of the present disclosure.

Exemplarily, when forming the display device having the structure shown in FIG. 9, the carrier layer 7 including the recessed portion 70 may be formed first, and then the light-emitting element 50 may be formed. Referring to FIG. 11, which is a schematic cross-sectional view of a carrier layer according to an embodiment of the present disclosure, the carrier layer 7 includes a recessed portion 70, and the recessed portion 70 includes a recessed surface S3. An angle formed between the recessed surface S3 and the plane of the reflective layer is equal to θ.

Exemplarily, as shown in FIG. 9 and FIG. 11, the carrier layer 7 further includes a through-hole H1 corresponding to the recessed surface S3. When the light-emitting element 50 and the carrier layer 7 are cooperatively configured, the electrode connection surface S2 of the light-emitting element 50 where the first connection electrode 51 and the second connection electrode 52 are provided can be configured corresponding to the received surface S3, so that the first connection electrode 51 and the second connection electrode 52 are electrically connected to the backlight driving circuit 4 through the above-mentioned through-hole H1. Exemplarily, the light-emitting element 50 can be electrically connected to the second thin film transistor 32 in the backlight driving circuit 4 through the through-hole H1. In this way, on the one hand, an angle θ is formed between the light-exiting surface S1 of the light-emitting element 50 and the plane of the reflective layer 6, so that the light emitted from the light-emitting element 50 can avoid the light-emitting element 50 after being reflected by the reflective layer 6; and on the other hand, it is only necessary to pattern the carrier layer 7 to form the required recessed portion 70 at the surface of the carrier layer 7, and the process thereof is simple and the cost is low. Exemplarily, the patterning process includes steps of exposure, development, and etching.

Figure 12:
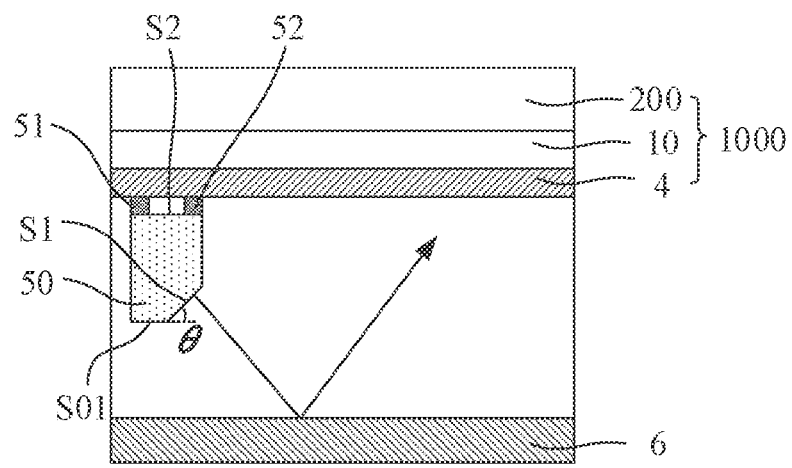
FIG. 12 is a schematic cross-sectional view of yet another display device according to an embodiment of the present disclosure.

In some embodiments of the present disclosure, a structure of the light-emitting element 50 can be adjusted. FIG. 12 is a schematic cross-sectional view of another display device according to an embodiment of the present disclosure. Exemplarily, as shown in FIG. 12, an angle θ may be formed between at least part of the light-exiting surface S1 of the light-emitting element 50 and the electrode connection surface S2. That is, at least part of the light-exiting surface S1 of the light-emitting element 50 is arranged to be inclined with respect to the electrode connection surface S2. In some embodiments of the present disclosure, when the light-emitting element 50 is used in a display device, as shown in FIG. 12, the electrode connection surface S2 of the light-emitting element 50 may be arranged parallel to the plane of the reflective layer 6. In the embodiments of the present disclosure, the light-exiting surface S1 of light-emitting element 50 is arranged to be inclined with respect to the electrode connection surface S, so that the light emitted from the light-emitting element 50 can avoid the light-emitting element 50 after being reflected by the reflective layer 6.

It should be noted that when the light-emitting element 50 includes a plurality of light-exiting surfaces located at different planes, in the embodiments of the present disclosure, all the light-exiting surfaces of the light-emitting element 50 may be arranged to be inclined with respect to the electrode connection surface S2, or, only part of the light-exiting surfaces may be arranged to be inclined with respect to the electrode connection surface S2. As shown in FIG. 12, the light-emitting element 50 includes the light-exiting surface S01 parallel to the electrode connection surface S2 and the light-exiting surface S1 inclined with respect to the electrode connection surface S2.

Exemplarily, the display device includes a plurality of light-emitting elements 50. In some embodiments of the present disclosure, when arranging a plurality of Mini LEDs 50 in the display device, the light-exiting surface S1 of one of the light-emitting elements 50 faces another one light-emitting element 50 adjacent to the one light-emitting element 50.

Figure 13:
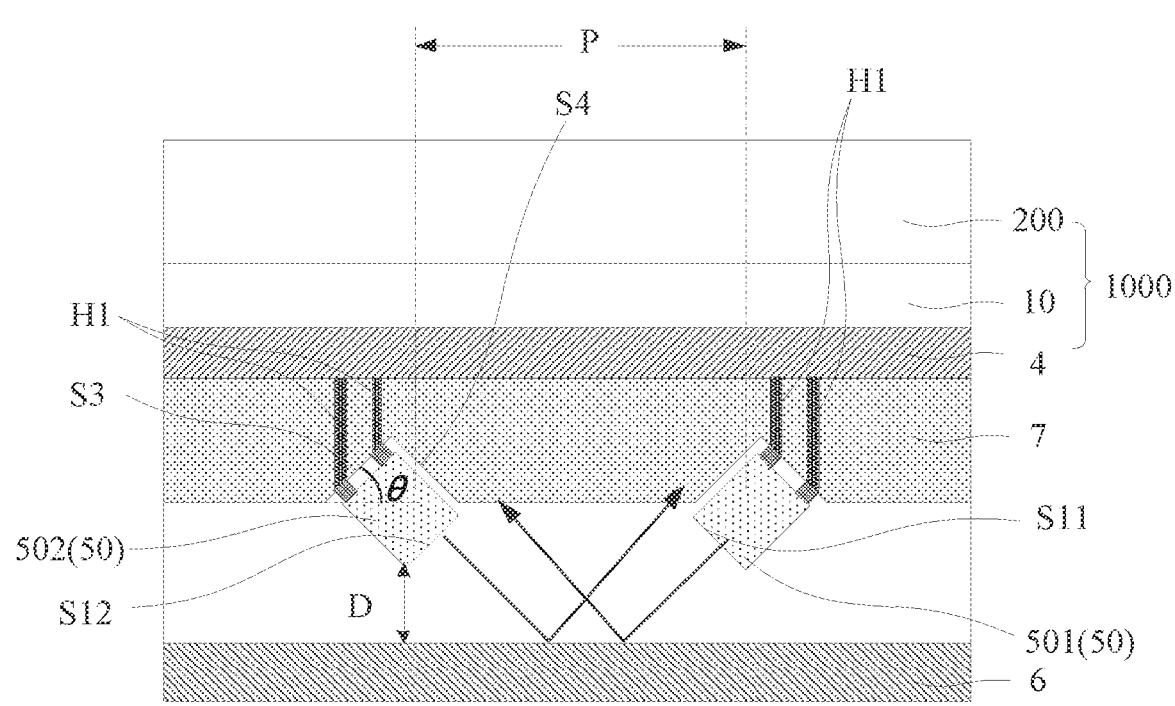
FIG. 13 is a schematic cross-sectional view of yet another display device according to an embodiment of the present disclosure.
Figure 14:
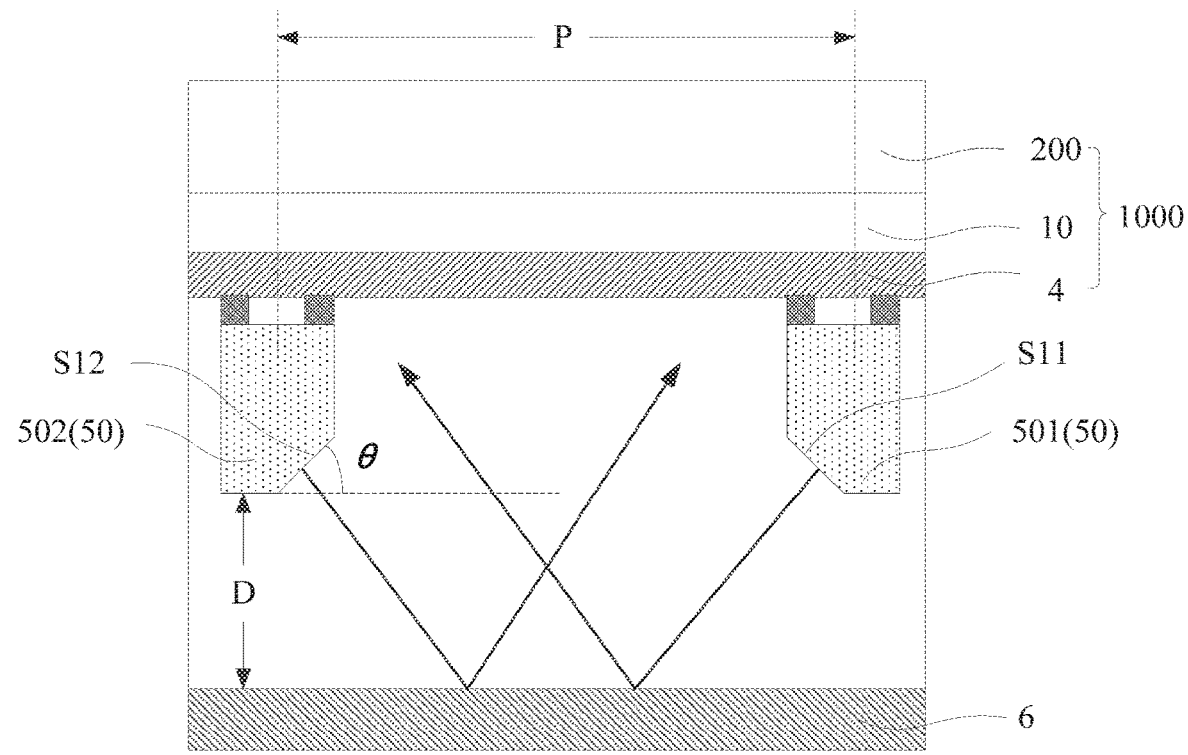
FIG. 14 is a schematic cross-sectional view of yet another display device according to an embodiment of the present disclosure.

For example, the light-emitting elements 50 in the display device include a first light-emitting element 501 and a second light-emitting element 502 that are arranged adjacently. FIG. 13 and FIG. 14 are schematic cross-sectional views of two other display devices according to embodiments of the present disclosure. As shown in FIG. 13 and FIG. 14, the first light-emitting element 501 includes a first light-exiting surface S11 located at a side of the first light-emitting element 501 adjacent to the second light-emitting element 502. The second light-emitting element 502 includes a second light-exiting surface S12 located at a side of the second light-emitting element 502 adjacent to the first light-emitting element 501. That is, for two adjacent light-emitting elements 50, when the light-exiting surfaces of the two adjacent light-emitting elements 50 are arranged to be inclined with respect to the reflective layer 6, the light-exiting surfaces of the two adjacent light-emitting elements 50 can be arranged to face each other, thereby avoiding the formation of a dark area between the two adjacent light-emitting elements 50 and improving the uniformity of the outputted light.

Exemplarily, as shown in FIG. 13 and FIG. 14, in some embodiments of the present disclosure, the first light-exiting surface S11 and the second light-exiting surface S12 may be symmetrically arranged, therefore, after the light emitted from the first light-emitting element 501 and the second light-emitting element 502 is reflected by the reflective layer 6, the reflected light has a more uniform distribution between the first light-emitting element 501 and the second light-emitting element 502.

Exemplarily, when arranging the light-emitting elements 50 in the display device, a distance between two adjacent light-emitting elements 50 is P, and along a direction perpendicular to a plane of the display panel, a distance between the light-emitting element 50 and the reflective layer 6 is D. In some embodiments of the present disclosure, it is defined P>2D tan θ. The distance between two adjacent light-emitting elements 50 refers to a distance between geometric centers of the two adjacent light-emitting elements 50. With reference to FIG. 13 and FIG. 14, a distance between the first light-emitting element 501 and the second light-emitting element 502 is P. The first light-emitting element 501 and the second light-emitting element 502 may be located in a same horizontal plane, and the distances between the first light-emitting element 501 (and the second light-emitting element 502) and the reflective layer 6 is D. In the embodiments of the present disclosure, by defining P>2D tan θ, the light reflected by the reflective layer 6 can exit from a position between the first light-emitting element 501 and the second light-emitting element 502, thereby avoiding the first light-emitting element 501 and the second light-emitting element 502 blocking the reflected light.

Exemplarily, when arranging the light-emitting elements 50 in the display device, in some embodiment of the present disclosure, at least one of the light-emitting elements 50 has at least two light-exiting surfaces, and the at least two light-exiting surface included by a same light-emitting element 50 intersect each other.

Figure 15:
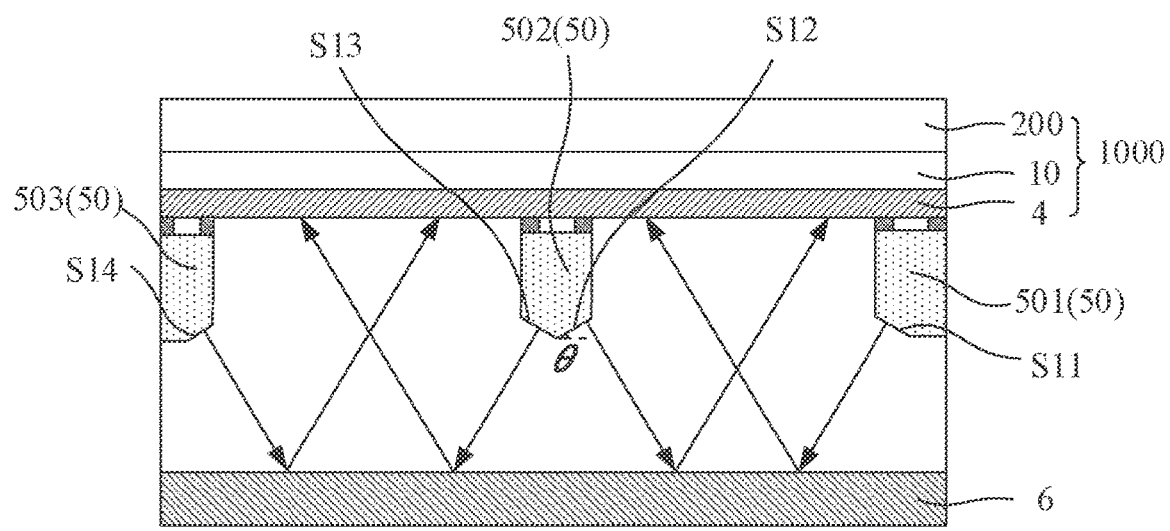
FIG. 15 is a schematic cross-sectional view of yet another display device according to an embodiment of the present disclosure.

FIG. 15 is a schematic cross-sectional view of another display device according to an embodiment of the present disclosure. Exemplarily, as shown in FIG. 15, the display device includes a first light-emitting element 501, a second light-emitting element 502 and a third light-emitting element 503 that are arranged adjacently, and the second light-emitting element 502 is located between the first light-emitting element 501 and the third light-emitting element 503. In some embodiments of the present disclosure, at least the second light-emitting element 502 located at a middle position includes at least two light-exiting surfaces, and two light-exiting surfaces of the at least two light-exiting surfaces of the second light-emitting element 502 face the first light-emitting element 501 and the third light-emitting element 503, respectively. In this way, the uniformity of the light between the first light-emitting element 501 and the second light-emitting element 502 can be improved, and the uniformity of the light between the second light-emitting element 502 and the third light-emitting element 503 can be improved. As shown in FIG. 15, the first light-emitting element 501 includes a first light-exiting surface S11 facing the second light-emitting element. The second light-emitting element 502 includes a second light-exiting surface S12 facing the first light-emitting element 501 and a third light-exiting surface S13 facing the third light-emitting element 503. The third light-emitting element 503 includes a fourth light-exiting surface S14 located at a side of the third light-emitting element 503 adjacent to the second light-emitting element 502.

Figure 16:
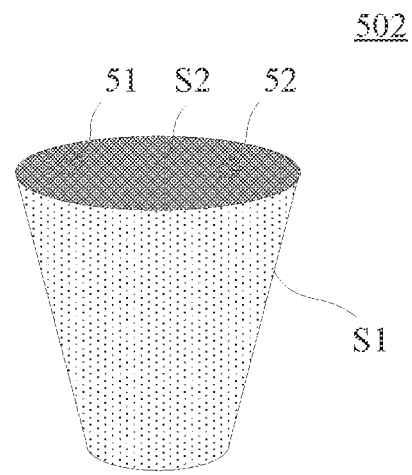
FIG. 16 is a schematic perspective view of a light-emitting element according to an embodiment of the present disclosure.
Figure 17:
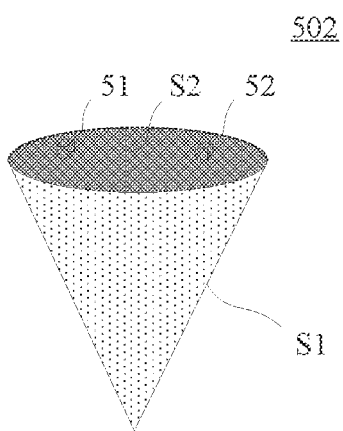
FIG. 17 is a schematic perspective view of another light-emitting element according to an embodiment of the present disclosure.
Figure 18:
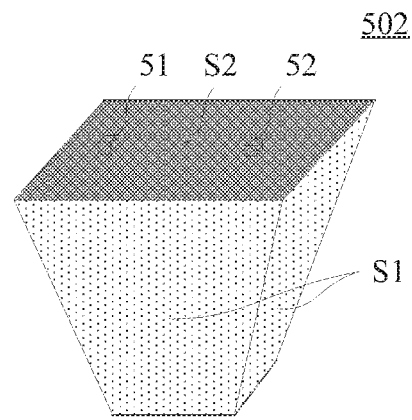
FIG. 18 is schematic perspective view of yet another light-emitting element according to an embodiment of the present disclosure.
Figure 19:
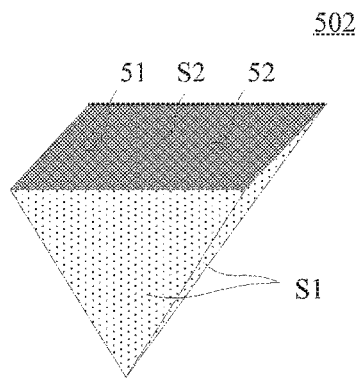
FIG. 19 is schematic perspective view of yet another light-emitting element according to an embodiment of the present disclosure.

It should be noted that the number of light-emitting surfaces of the second light-emitting element 502 can be determined according to the number of light-emitting elements arranged around the second light-emitting element 502. FIG. 15 merely exemplarily illustrates a structure of a second light-emitting element 502 in a case where a first light-emitting element 501 and a third light-emitting element 503 are arranged at two sides of the second light-emitting element 502. When more light-emitting elements are arranged around the second light-emitting element 502, the second light-emitting element 502 may be configured to include more light-exiting surfaces according to the embodiments of the present disclosure. For example, in some embodiments of the present disclosure, the second light-emitting element 502 can be configured to have any one or more of the following shapes: a truncated circular shape as shown in FIG. 16, a conical shape as shown in FIG. 17, a pyramid shape as shown in FIG. 18, or a pyramid shown in FIG. 19. FIG. 16, FIG. 17, FIG. 18 and FIG. 19 respectively illustrate schematic perspective views of other four light-emitting elements according to the embodiments of the present disclosure. In some embodiments of the present disclosure, a side surface of the truncated circular shape, the conical shape, the pyramid shape, or the pyramid shown mentioned above may be configured as the light-exiting surface of the second light-emitting element 502, so that the second light-emitting element 502 can emit light in multiple directions.

Figure 20:
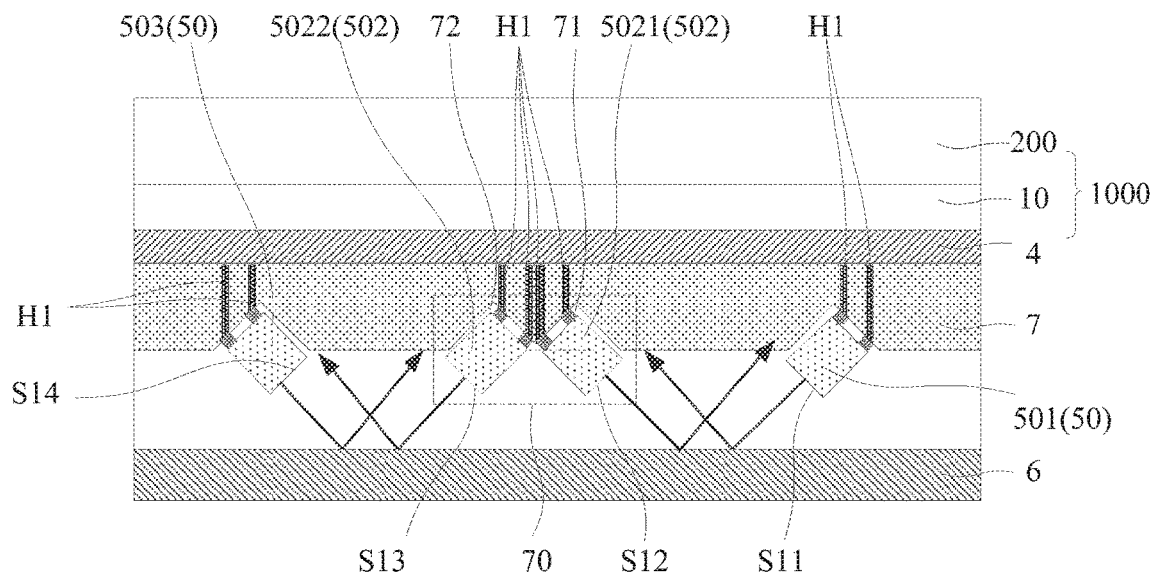
FIG. 20 is a schematic cross-sectional view of yet another display device according to an embodiment of the present disclosure.

FIG. 20 is a schematic cross-sectional view of another display device according to an embodiment of the present disclosure. In some embodiments of the present disclosure, as shown in FIG. 20, the second light-emitting element 502 includes at least a first light-emitting sub-element 5021 and a second light-emitting sub-element 5022. The first light-emitting element 501, the third light-emitting element 503, the first light-emitting sub-element 5021 and the second light-emitting sub-element 5022 each have the structure shown in FIG. 8. That is, the light-exiting surfaces S1 of the first light-emitting element 501, the third light-emitting element 503, the first light-emitting sub-element 5021 and the second light-emitting sub-element 5022 are all parallel to the respective electrode connection surfaces S2.

Figure 21:
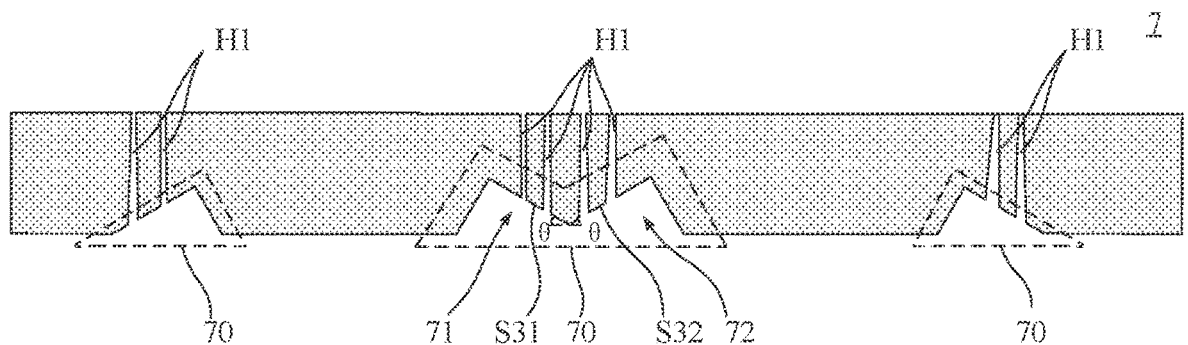
FIG. 21 is a schematic cross-sectional view of yet another carrier layer according to an embodiment of the present disclosure.

FIG. 21 is a schematic cross-sectional view of another carrier layer according to an embodiment of the present disclosure. With reference to FIG. 20 and FIG. 21, at least one of the recessed portions 70 in the carrier layer 7 includes a first recessed sub-portion 71 and a second recessed sub-portion 72. The first recessed sub-portion 71 and the second recessed sub-portion 72 are adjacent to each other. When the first light-emitting sub-element 5021 and the second light-emitting sub-element 5022 are arranged in the display device, as shown in FIG. 20, the first light-emitting sub-element 5021 and the second light-emitting sub-element 5022 of a same light-emitting element 50 are respectively located in the first recessed sub-portion 71 and the second recessed sub-portion 72. With such a configuration, the light-exiting direction of the light emitted from the first light-emitting sub-element 5021 is different from the light-exiting-direction of the light emitted from the second light-emitting sub-element 5022.

As shown in FIG. 21, the first recessed sub-portion 71 includes a first recessed sub-surface S31, and an angle θ is formed between the first recessed sub-surface S31 and a plane of the reflective layer (not shown in FIG. 21). Moreover, the carrier layer 7 includes a through-hole H1 corresponding to the first recessed sub-surface S31. The second recessed sub-portion 72 includes a second recessed sub-surface S32. An angle θ is formed between the second recessed sub-surface S32 and the plane of the reflective layer (not shown in FIG. 21). The carrier layer 7 includes a through-hole H1 corresponding to the second recessed sub-surface S32.

When the first light-emitting sub-element 5021 and the second light-emitting sub-element 5022 are configured cooperatively with the carrier layer 7, the electrode connection surfaces of the first connection electrode 51 and the second connection electrode 52 of the first light-emitting sub-element 5021 can be arranged corresponding to the first recessed sub-surface S31, and the electrode connection surfaces of the first connection electrode 51 and the second connection electrode 52 of the second light-emitting sub-element 5022 can be arranged corresponding to the second recessed sub-surface S32, so that the first connection electrode 51 and the second connection electrode 52 can be electrically connected to the backlight driving circuit 4 through the respective through-hole H1 described above.

Exemplarily, in some embodiments of the present disclosure, when the display device works, the different first light-emitting sub-element 5021 and second light-emitting sub-element 5022 in the second light-emitting element 502 receive a same driving signal. In an embodiment of the present disclosure, the first connection electrodes 51 of the first light-emitting sub-element 5021 is electrically connected to the first connection electrodes 51 of the second light-emitting sub-element 5022, and the second connection electrode 52 of the first light-emitting sub-element 5021 is electrically connected to the second connection electrode 52 of the second light-emitting sub-element 5022.

Exemplarily, as shown in FIG. 21, the first recessed sub-portion 71 and the second recessed sub-portion 72 may be symmetrically arranged.

In some embodiments of the present disclosure, the light-exiting surface of the light-emitting element 50 may include an arc surface, so that the light emitted from the light-emitting element 50 can be uniformly propagated in multiple directions.

Figure 22:
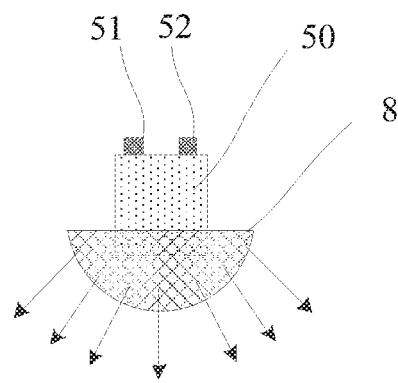
FIG. 22 is a schematic cross-sectional view of yet another light-emitting element according to an embodiment of the present disclosure.

FIG. 22 is a schematic cross-sectional view of another light-emitting element according to an embodiment of the present disclosure. Exemplarily, as shown in FIG. 22, the display device further includes a light cover 8 located at a light-exiting side of the light-emitting element 50. Exemplarily, a surface of the light cover 8 away from the light-emitting element 50 includes a curved surface. For example, the light cover 8 may be shaped as at least one part of a spherical surface. With such a configuration, a propagation direction of the light emitted from the light-emitting element 50 can be changed, so that the light emitted from different positions of the light-emitting element 50 has a more uniform intensity.

Figure 23:
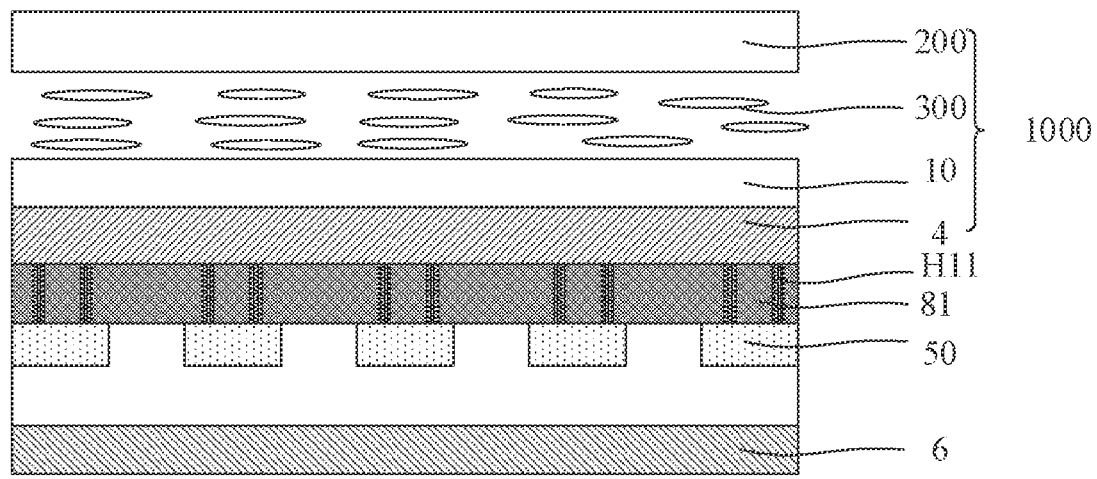
FIG. 23 is a schematic cross-sectional view of yet another display device according to an embodiment of the present disclosure.

FIG. 23 is a schematic cross-sectional view of another display device according to an embodiment of the present disclosure. Exemplarily, as shown in FIG. 23, the display device further includes a first diffusion layer 81 located between the light-emitting element 50 and the base 10. The first diffusion layer 81 can adjust the propagation direction of the light emitted from the light-emitting element 50, so that the light that passes through the first diffusion layer 81 can propagate uniformly in multiple directions. Therefore, the backlight directed to the display panel 1000 is more uniform, thereby achieving a uniform light. As shown in FIG. 23, the first diffusion layer 81 includes a through-hole H11, and the light-emitting element 50 is electrically connected to the backlight driving circuit 4 through the through-hole H11.

Figure 24:
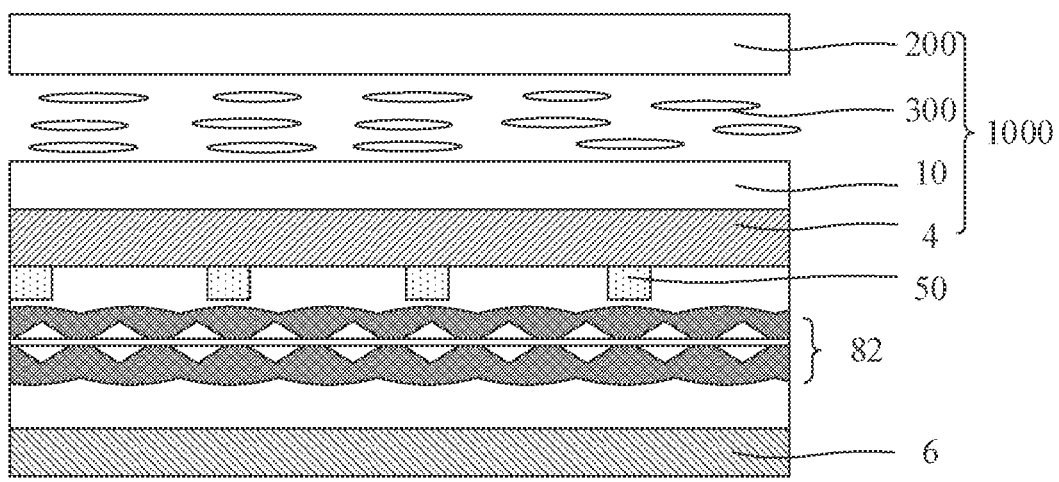
FIG. 24 is a schematic cross-sectional view of yet another display device according to an embodiment of the present disclosure.

FIG. 24 is a schematic cross-sectional view of another display device according to an embodiment of the present disclosure. In some embodiments of the present disclosure, as shown in FIG. 24, the display device further includes a second diffusion layer 82 located between the light-emitting element 50 and the reflective layer 6. The light emitted from the light-emitting element 50 can be scattered or refracted by the second diffusion layer 82 when being directed to the reflective layer 6, so that the light intensity consistency of the light propagating in different directions can be improved, thereby achieving uniform light. After the light is reflected by the reflective layer 6, the reflected light can be scattered or refracted again by the second diffusion layer 82 when being directed to the display panel 1000, thereby further improving the uniformity of the backlight directed to the display panel 1000.

Exemplarily, the first diffusion layer 81 or the second diffusion layer 82 includes diffusion particles and/or microstructures. FIG. 24 is a schematic diagram illustrating a case where microstructures are arranged at both the surface of and the interior of the second diffusion layer 82. Alternatively, diffusion particles can be arranged at a side of the first diffusion layer 81 or the second diffusion layer 82, microstructures including chamfered pyramids can be arranged at another side of the first diffusion layer 81 or the second diffusion layer 82. The present disclosure is not limited thereto. Alternatively, the first diffusion layer 81 or the second diffusion layer 82 may be formed by spraying or coating.

Figure 25:
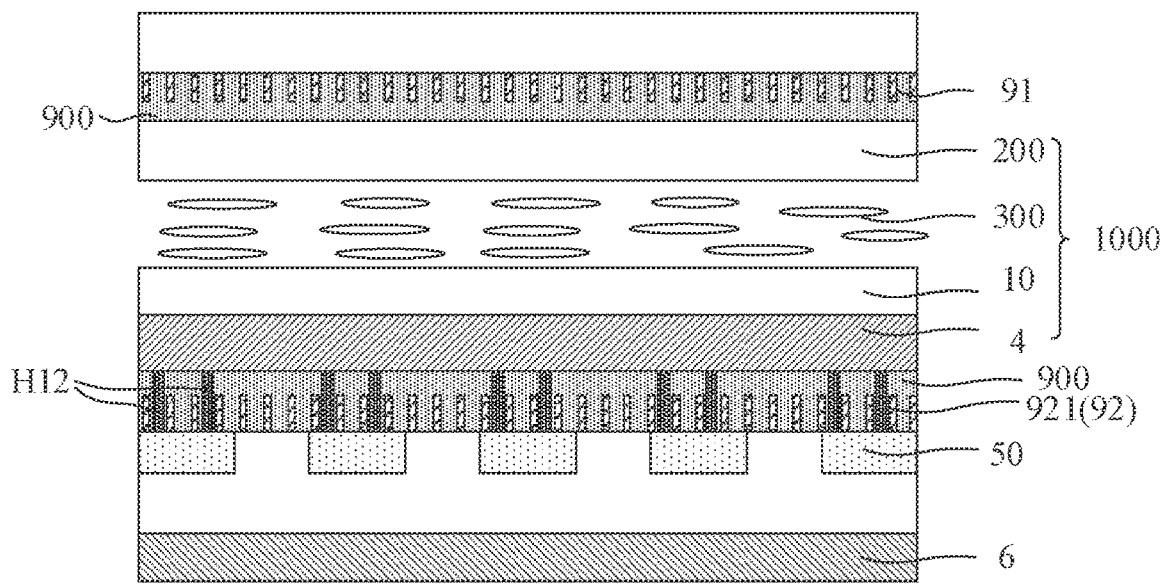
FIG. 25 is a schematic cross-sectional view of yet another display device according to an embodiment of the present disclosure.

FIG. 25 is a schematic cross-sectional view of another display device according to an embodiment of the present disclosure. In some embodiments of the present disclosure, as shown in FIG. 25, the display device further includes a first polarizer 91 and a second polarizer 92. The first polarizer 91 is located at a side of the liquid crystal layer 300 away from the base 10. The second polarizer 92 is located between the light-emitting element 50 and the liquid crystal layer 300. The polarization directions of the first polarizer 91 and the second polarizer 92 are perpendicular to each other. Exemplarily, at least one of the first polarizer 91 and the second polarizer 92 may be formed by adsorbing a dichroic dye by a stretched polymer film, and the polymer may be polyvinyl alcohol (PVA) and the dichroic dye may be iodine, organic dyes, etc., but not limited thereto. Alternatively, at least one of the first polarizer 91 and the second polarizer 92 may include a metal wire grid polarizer. Exemplarily, the metal wire grid polarizer includes a nanowire grid polarizer. The material of the metal wire grid polarizer includes one or more of aluminum, chromium, gold, and nickel.

Exemplarily, as shown in FIG. 25, in some embodiments of the present disclosure, the second polarizer 92 includes a first metal wire grid polarizer 921, and the first metal wire grid polarizer 921 is located between the light-emitting element 50 and the base 10. Exemplarily, the first metal wire grid polarizer 921 is located between the light-emitting element 50 and the backlight driving circuit 4. As shown in FIG. 25, the first metal wire grid polarizer 921 includes a through-hole H12, and the light-emitting element 50 is electrically connected to the backlight driving circuit 4 through the through-hole H12. The first metal wire grid polarizer 921 has strong durability and reliability in high temperature or high humidity environments. In the embodiments of the present disclosure, the second polarizer 92 includes the first metal wire grid polarizer 921, and when forming the backlight driving circuit 4 and the light-emitting element 50, the first metal wire grid polarizer 921 can be guaranteed not to be damaged, and the display effect of the display device can be guaranteed.

Figure 26:
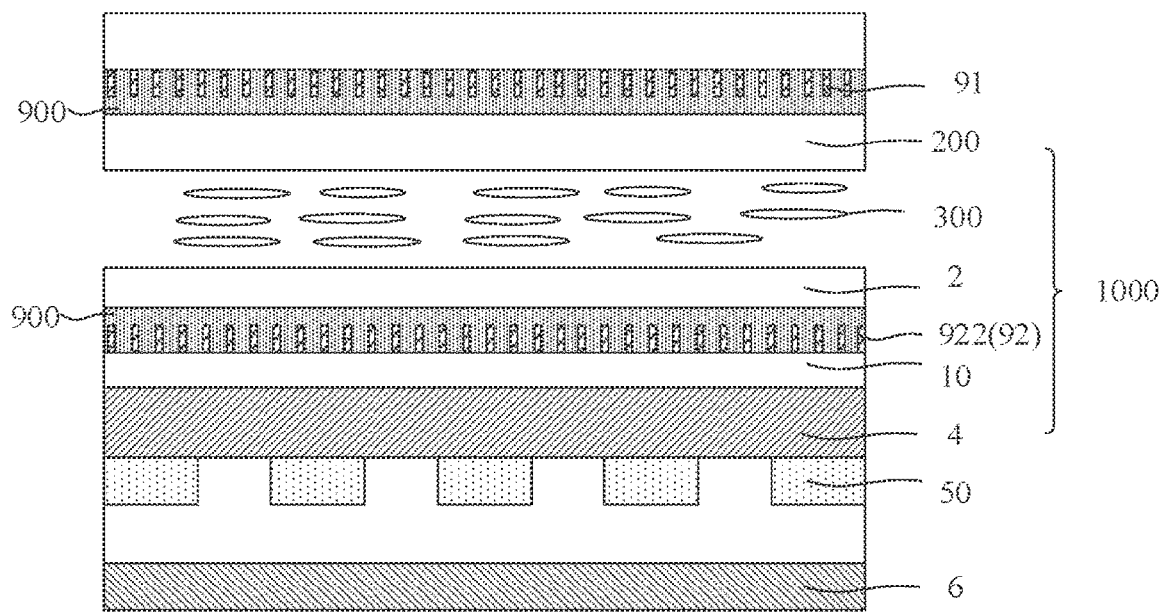
FIG. 26 is a schematic cross-sectional view of yet another display device according to an embodiment of the present disclosure.

FIG. 26 is a schematic cross-sectional view of another display device according to an embodiment of the present disclosure. As shown in FIG. 26, in some embodiments of the present disclosure, the second polarizer 92 includes a second metal wire grid polarizer 922 that is located between the base 10 and the display driving circuit 2. The second metal wire grid polarizer 922 has strong durability and reliability in high temperature or high humidity environments. In the embodiments of the present disclosure, the second polarizer 92 includes the second metal wire grid polarizer 922. When forming the display driving circuit 2, the backlight driving circuit 4 and the light-emitting element 50, the second metal wire grid polarizer 922 can be guaranteed not to be damaged, and the display effect of the display device can be guaranteed. Moreover, in the embodiments of the present disclosure, the second metal wire grid polarizer 922 is located between the base 10 and the display driving circuit 2, thereby increasing a distance between the second metal wire grid polarizer 922 and the light-emitting element 50, which is beneficial to improving the uniformity of light received at different positions at the second metal wire grid polarizer 922.

Exemplarily, when the first metal wire grid polarizer 921 and/or the above-mentioned first diffusion layer 81 described above are arranged between the light-emitting element 50 and the base 10, in some embodiments of the present disclosure, the first wire grid polarizer 921 and/or the first diffusion layer 81 can be reused as the carrier layer 7 described above. With reference to FIG. 9, the first diffusion layer 81 is located between the light-emitting element 50 and the base 10, and the first diffusion layer 81 is used as the carrier layer 7. As shown in FIG. 9, the first diffusion layer 81 includes the recessed portion 70 for receiving the light-emitting element 50, and the through-hole H1 for connecting the light-emitting element 50 and the backlight driving circuit 4.

Figure 27:
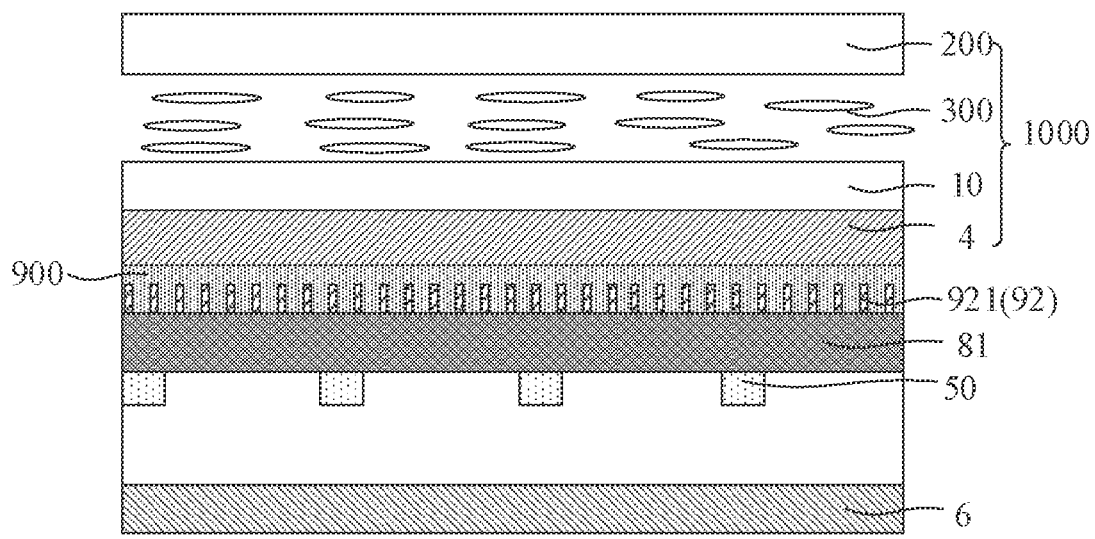
FIG. 27 is a schematic cross-sectional view of yet another display device according to an embodiment of the present disclosure.

FIG. 27 is a schematic cross-sectional view of another display device according to an embodiment of the present disclosure. Exemplarily, as shown in FIG. 27, the first metal wire grid polarizer 921 and the first diffusion layer 81 are provided between the light-emitting element 50 and the base 10. As shown in FIG. 27, the first diffusion layer 81 is located between the light-emitting element 50 and the first metal wire grid polarizer 921. In this case, the light emitted from the light-emitting element 50 can be polarized by the first metal wire grid polarizer 921 after being diffused by the first diffusion layer 81, which is beneficial to improving the uniformity of the light received by the first metal wire grid polarizer 921.

Exemplarily, as shown in FIGS. 25, FIG. 26 and FIG. 27, the display device further includes a flat separation layer 900. The flat separation layer 900 is in contact with the first polarizer 91 and/or the second polarizer 92. When the first polarizer 91 or the second polarizer 92 includes the metal wire grid polarizer, the flat separation layer 900 can provide a flat surface for the first polarizer 91 or the second polarizer 92, and can also make the first polarizer 91 or the second polarizer 92 be spaced from a film layer adjacent to it.

Figure 28:
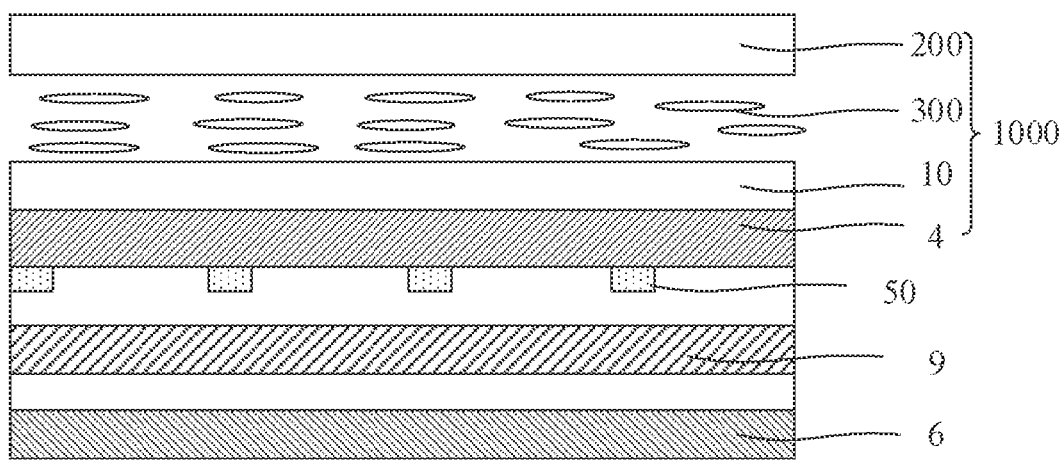
FIG. 28 is a schematic cross-sectional view of yet another display device according to an embodiment of the present disclosure.

FIG. 28 is a schematic cross-sectional view of another display device according to an embodiment of the present disclosure. Exemplarily, as shown in FIG. 28, a color conversion layer 9 is further provided between the light-emitting element 50 and the reflective layer 6. The color conversion layer 9 is configured to generate light having a preset color under the excitation of the light emitted from the light-emitting element 50. Exemplarily, the color conversion layer 9 includes a fluorescent film layer and/or a quantum dot film layer.

The color conversion layer is configured to perform color conversion on the light emitted from the light-emitting element, and perform light mixing, such that the backlight source finally outputs white light. Exemplarily, in some embodiments of the present disclosure, the light-emitting element 50 may be a blue light-emitting element that emits blue light, and the color conversion layer 9 may include a yellow fluorescent material. The blue light emitted from the blue light-emitting element excites the yellow phosphor to emit yellow light, and the yellow light is mixed with the blue light emitted from the blue light-emitting element to form white light. In other embodiments of the present disclosure, the color of the light emitted from the light-emitting element 50 and the color of the fluorescent material in the color conversion layer can also be other colors, and the backlight source finally outputs composite light such as white light. Or, in some embodiments of the present disclosure, monochromatic light such as red light, green light or blue light can be outputted from the light-emitting element 50 after passing through the color conversion layer 9. The present disclosure is not limited to the above-described examples.

Figure 29:
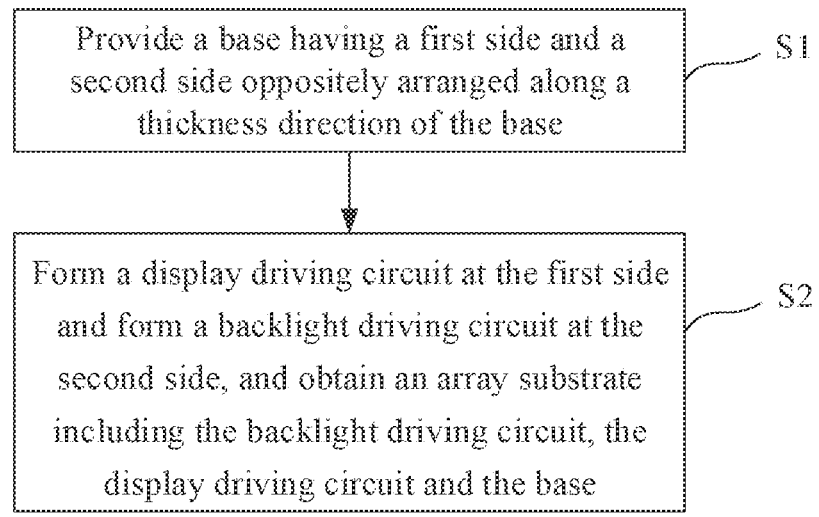
FIG. 29 is a schematic flowchart of a method for manufacturing an array substrate according to an embodiment of the present disclosure.

An embodiment of the present disclosure provides a method for forming a display panel. As shown in FIG. 1, the display panel includes an array substrate 100. With reference to FIG. 29, which is a schematic flowchart of a method for manufacturing an array substrate according to the embodiments of the present disclosure, and the method for manufacturing an array substrate 100 includes the following steps.

At step S1, a base 10 is provided, and the base 10 has a first side and a second side oppositely arranged along a thickness direction of the substrate 10.

At step S2, a display driving circuit 2 is formed at the first side and a backlight driving circuit 4 is formed at the second side, and thus an array substrate 100 including the backlight driving circuit 4, the display driving circuit 2 and the base 10 is obtained. The display driving circuit 2 includes a first thin film transistor 31. The backlight driving circuit 4 is configured to drive the backlight source to emit light. The backlight driving circuit 4 includes a second thin film transistor 32. Each of the first thin film transistor 31 and the second thin film transistor 32 includes a gate electrode 310, a source electrode 311, a drain electrode 312 and a semiconductor layer 313. Exemplarily, the display driving circuit 2 further includes a pixel electrode 21, and the first thin film transistor 31 is electrically connected to the pixel electrode 21.

It should be noted that, the embodiments of the present disclosure do not limit an order for forming the display driving circuit 2 and the backlight driving circuit 4. For example, the display driving circuit 2 may be formed first, and then the backlight driving circuit 4 may be formed. Alternatively, the backlight driving circuit 4 may be formed first, and then the display driving circuit 2 may be formed. Alternatively, the display driving circuit 2 and the backlight driving circuit 4 may be formed at the same time.

In the method for manufacturing the display panel according to the embodiments of the present disclosure, the display driving circuit 2 and the backlight driving circuit 4 are provided at the first side and the second side of the base 10, respectively, and there is no need provide different carrier substrates for forming the display driving circuit 2 and the backlight driving circuit 4, which is beneficial to reducing the thickness of the prepared display panel 1000 and reducing the weight of the prepared display panel 1000.

Figure 30:
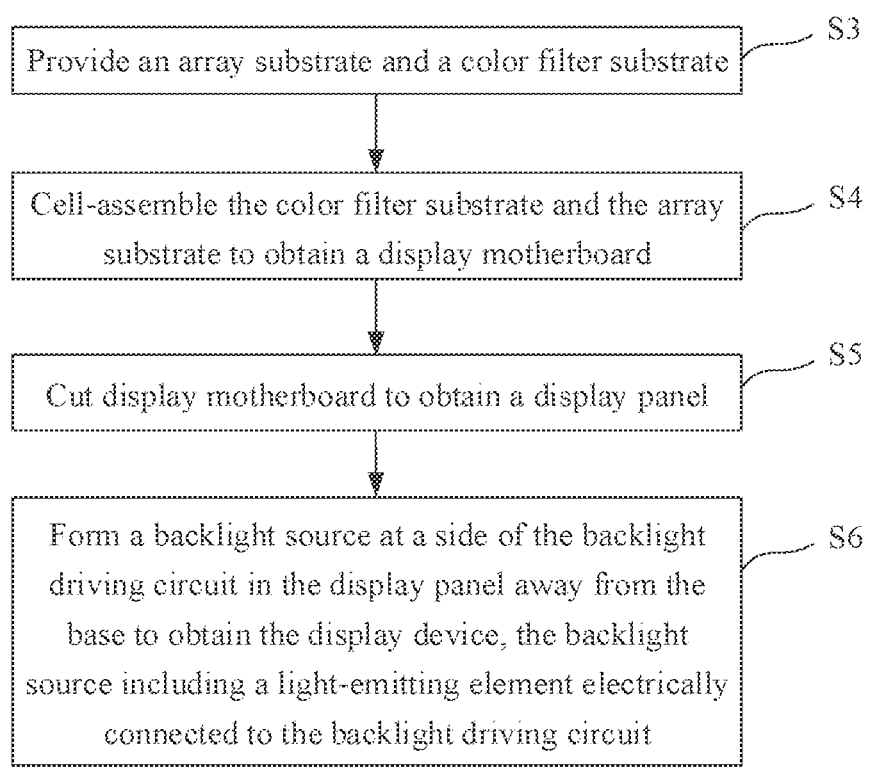
FIG. 30 is a schematic flowchart of a method for manufacturing a display device according to an embodiment of the present disclosure.
Figures 31, 32:
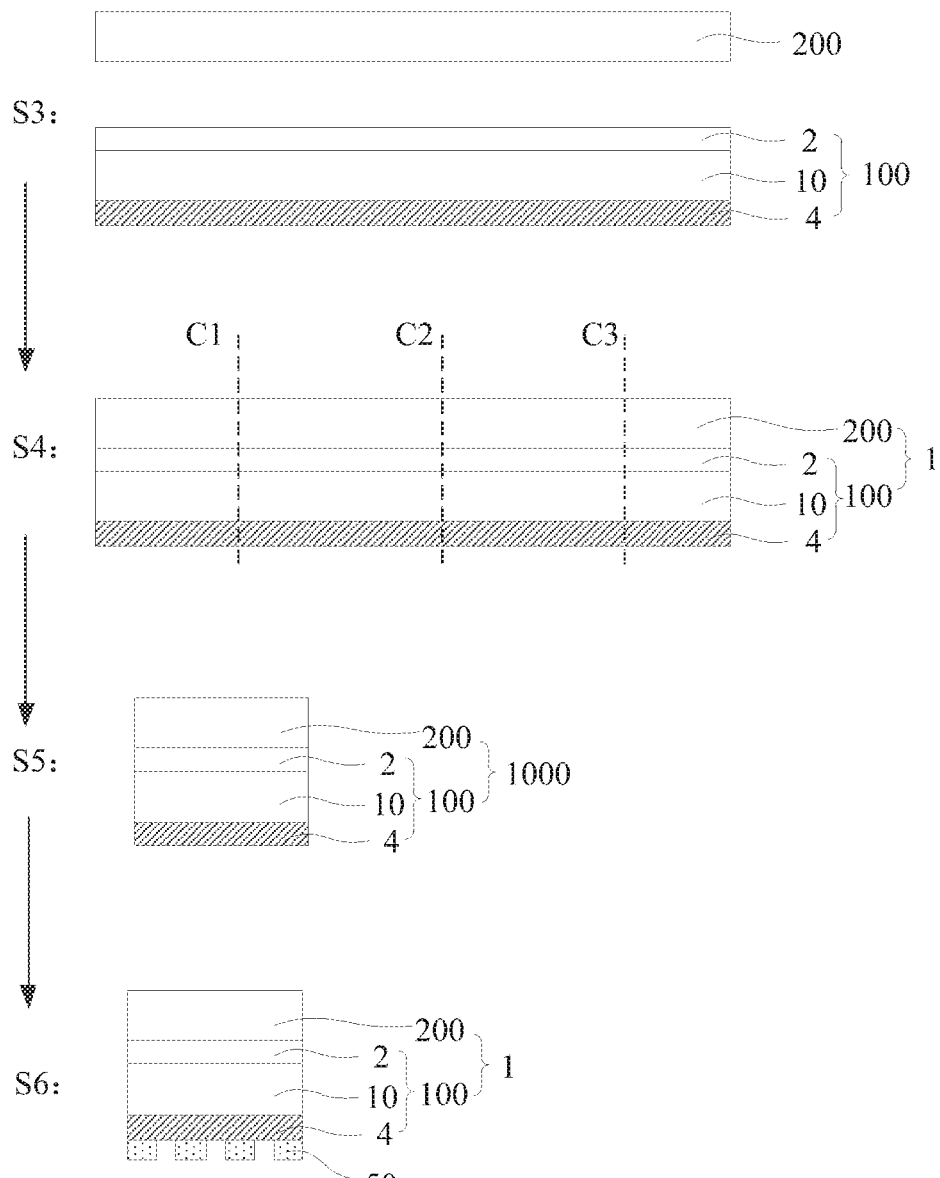
FIG. 31 is a schematic structural flow diagram corresponding to FIG. 30.
FIG. 32 is a schematic flowchart of another method for manufacturing a display device according to an embodiment of the present disclosure.

An embodiment of the present disclosure further provides a method for manufacturing a display device. FIG. 30 is a schematic flowchart of a method for forming a display device according to an embodiment of the present disclosure, and FIG. 31 is a schematic structural flow diagram corresponding to FIG. 30. As shown in FIG. 30 and FIG. 31, the method includes the following steps.

At step S3, an array substrate 100 and a color filter substrate 200 are provided. The array substrate 100 is obtained by the above-mentioned method. The color filter substrate 200 includes color resists corresponding to different colors.

At step S4, the color filter substrate 200 and the array substrate 100 are cell-assembled to obtain a display motherboard 1. Exemplarily, the display motherboard 1 includes a plurality of cutting lines. FIG. 31 shows different cutting lines C1, C2 and C3, respectively.

At step S5, the display motherboard 1 is cut along the cutting lines C1, C2 and C3 to obtain a display panel 1000 having a smaller size.

At step S6, a backlight source is formed at a side of the backlight driving circuit 4 in the display panel 1000 away from the base 1 to obtain the display device, and the backlight source includes a light-emitting element 5 electrically connected to a second thin film transistor or the wiring in the backlight driving circuit 4. Exemplarily, the light-emitting element 50 can be bonded, by means of eutectic soldering or reflow soldering, to the side of the base 10 where the backlight driving circuit 4 is located.

In the method for manufacturing the display device according to the embodiments of the present disclosure, the display driving circuit 2 and the backlight driving circuit 4 are provided at the first side and the second side of the base 10 of the display panel 1000, respectively, and there is no need to provide different carriers for the display driving circuit 2 and the backlight driving circuit 4 respectively. In this way, it is beneficial to reducing the thickness of the display device, reducing the weight of the display device, and reducing the cost of the display device. Moreover, with such a configuration, after the display driving circuit 2 and the backlight driving circuit 4 are formed, the alignment and attachment operation can be omitted, which is beneficial to simplify the process for forming the display device.

In addition, in the embodiments of the present disclosure, the light-emitting element is formed after the cell-assembling process of the display panel 1000. In this way, on the one hand, a size of the display panel 1000 can be reduced to reduce the light-emitting elements 50 that need to be transferred, thereby improving the process efficiency and yield of the transfer assembly of the light-emitting elements 50; and on the other hand, it can avoid the contamination of the materials in the cell during the formation of the light-emitting element 50.

Exemplarily, as shown in FIG. 25, the display panel 1000 includes a liquid crystal layer 300 located between the display driving circuit 2 and the color filter substrate 200. After the light-emitting element 50 is formed at a side of the backlight driving circuit 4 away from the base 1 in the step S6 described above, the method for forming the display device according to an embodiment of the present disclosure further includes: forming a first polarizer 91 at a side of the liquid crystal layer 300 away from the base 10. Exemplarily, the first polarizer 91 may be formed by adsorbing dichroic dyes by a stretched polymer film, and the polymer may be polyvinyl alcohol (PVA), and the dichroic dyes may be iodine, organic dyes, etc., but not limited thereto. Alternatively, the first polarizer 91 may also include a metal wire grid polarizer. In the embodiments of the present disclosure, the first polarizer 91 is formed after the formation of the light-emitting element 50, so that it can avoid that the formation process of the light-emitting element 50 has an influence on the formation of the first polarizer 91 to damage to the performance of the first polarizer 91.

In some embodiments of the present disclosure, the formation of the liquid crystal layer 300 may be performed before the cell-assembling of the color filter substrate 200 and the array substrate 100. For example, the liquid crystal layer 300 is formed by one drop filling (ODF, liquid crystal dropping) method. A side of the array substrate 100 and the color filter substrate 200 is coated with sealant, and liquid crystals is dropped at another side of the array substrate 100 and the color filter substrate 200. Then, the array substrate 100 and the color filter substrate 200 are attached to each other, to seal the liquid crystal layer 300 therebetween. Alternatively, after the array substrate 100 and the color filter substrate 200 are attached to each other, the space defined by the array substrate 100 and the color filter substrate 200 is filled with the liquid crystal layer 300 through an opening reserved in advance. The present disclosure is not limited by the above examples.

Exemplarily, as shown in FIG. 25, the method for manufacturing the display device further includes: forming a second polarizer 92 between the light-emitting element 50 and the liquid crystal layer 300.

Exemplarily, the second polarizer 92 includes a metal wire grid polarizer. With reference to FIG. 25, the metal wire grid polarizer includes a first metal wire grid polarizer 921 located between the base 10 and the light-emitting element 50.

Exemplarily, as shown in FIG. 25, the above-mentioned method for forming the first metal wire grid polarizer 921 includes: after forming the backlight driving circuit 4 at the second side of the base 10 and before forming the light-emitting element 50 at the side of the backlight driving circuit 4 away from the base 10, forming a first metal wire grid polarizer 921 at the second side.

In some embodiments of the present disclosure, as shown in FIG. 26, the metal wire grid polarizer of the second polarizer 92 includes a second metal wire grid polarizer 922 located between the base 10 and the liquid crystal layer 300. In some embodiments of the present disclosure, the above-mentioned method for forming the metal wire grid polarizer includes: before forming the display driving circuit 2 at the first side of the base 10, forming the second metal wire grid polarizer 922 at the first side of the base 10.

Exemplarily, the formation of the first metal wire grid polarizer 921 or the second metal wire grid polarizer 922 can be performed by any one of yellow light, spray coating, and embossing.

FIG. 32 is a schematic flowchart of a method for manufacturing a display device according to another embodiment of the present disclosure. Exemplarily, as shown in FIG. 9 and FIG. 32, before the above-mentioned step S6 of forming the light-emitting element 50 at the side of the backlight driving circuit 4 away from the base 10, the method further includes the following steps.

At step S51, a carrier layer 7 is formed at the side of the backlight driving circuit 4 away from the base 10. Exemplarily, the carrier layer 7 may include one or more films. For example, the first diffusion layer 81 and/or the second polarizer 92 described above can be reused as the carrier layer 7.

At step S5, a through-hole H1 passing through the carrier layer 7 is formed. Exemplarily, the through-hole H1 may be formed by patterning processes such as exposure, development, and etching.

After the through-hole H1 is formed, the light-emitting element 50 is formed at a side of the carrier layer 7 away from the base 10, and the light-emitting element 50 is electrically connected to the backlight driving circuit 4 through the through-hole H1.

In some embodiments of the present disclosure, as shown in FIG. 9 and FIG. 10, after the above-mentioned step S51, a recessed portion 70 may be formed in the carrier layer 7, and an angle θ may be formed between a recessed surface S3 of the recessed portion 70 and a plane of the carrier layer 7. Subsequently, at least part of the light-emitting element 50 can be disposed in the recessed portion 70, so that an angle θ can be formed between the light-exiting surface of the light-emitting element 50 and the plane of the reflective layer.

As shown in FIG. 10, the recessed surface S3 and the through-hole H1 correspond to each other. When configuring the light-emitting element 50, an electrode connection surface S2 of the light-emitting element 50 can be arranged corresponding to the recessed surface S3, so that the connection electrode of the light-emitting element 50 is electrically connected to the backlight driving circuit 4 through the through-hole H1.

The above-described embodiments are merely preferred embodiments of the present disclosure and are not intended to limit the present disclosure. Any modifications, equivalent substitutions and improvements made within the principle of the present disclosure shall fall into the protection scope of the present disclosure.

We claim:

1. A display device, comprising a backlight source, a reflective layer and a display panel,
wherein the display panel comprises: a base comprising a first side and a second side oppositely arranged along a thickness direction of the base, a display driving circuit located at the first side of the base, and a backlight driving circuit located at the second side of the base, wherein the display driving circuit comprises a first thin film transistor, and the backlight driving circuit is configured to drive the backlight source to emit light and comprises a second thin film transistor,
wherein the backlight source comprises a light-emitting element, the light-emitting element is electrically connected to the backlight driving circuit, and a light-exiting surface of the light-emitting element is located at a side of the light-emitting element away from the base;
wherein the reflective layer is located at the side of the light-emitting element away from the base; and
wherein the reflective layer comprises a reflective bowl at a side of the reflective layer adjacent to the light-emitting element.

2. The display device according to claim 1, wherein along a direction perpendicular to a plane of the display panel, a distance between the light-emitting element and the reflective bowl is L, and a curvature radius of the reflective bowl is R, where R<L.

3. The display device according to claim 1, further comprising a convex lens, wherein the convex lens is located at a side of the reflective bowl adjacent to the base.

4. The display device according to claim 3, wherein a main optical axis of the convex lens corresponds to a center of the reflective bowl.

5. The display device according to claim 1, further comprising a second metal wire grid polarizer provided between the base and the display driving circuit.

6. The display device according to claim 1, further comprising a second diffusion layer provided between the light-emitting element and the reflective layer.

7. The display device according to claim 1, further comprising a color conversion layer provided between the light-emitting element and the reflective layer, wherein the color conversion layer is configured to emit light having a preset color under an excitation of light emitted from the light-emitting element.

8. The display device according to claim 1, wherein the light-exiting surface of the light-emitting element comprises a curved surface.

9. The display device according to claim 8, further comprising a light cover located at a light-exiting side of the light-emitting element, wherein a surface of the light cover away from the light-emitting element comprises an arc surface.

10. A display device, comprising a backlight source, a reflective layer and a display panel,
wherein the display panel comprises: a base comprising a first side and a second side oppositely arranged along a thickness direction of the base, a display driving circuit located at the first side of the base, and a backlight driving circuit located at the second side of the base, wherein the display driving circuit comprises a first thin film transistor, and the backlight driving circuit is configured to drive the backlight source to emit light and comprises a second thin film transistor,
wherein the backlight source comprises a light-emitting element, the light-emitting element is electrically connected to the backlight driving circuit, and a light-exiting surface of the light-emitting element is located at a side of the light-emitting element away from the base;
wherein the reflective layer is located at the side of the light-emitting element away from the base; and
wherein an angle θ is formed between the light-exiting surface of the light-emitting element and a plane of the reflective layer, where $0°<θ<90°$.

11. The display device according to claim 10, wherein the backlight source comprises a plurality of light-emitting elements, and a distance between two adjacent light-emitting elements of the plurality of light-emitting elements is P, and wherein along a direction perpendicular to a plane of the display panel, a distance between one of the plurality of light-emitting elements and the reflective layer is D, where $P>2D \tan θ$.

12. The display device according to claim 10, wherein the backlight source comprises a plurality of light-emitting elements, and the plurality of light-emitting elements comprises a first light-emitting element and a second light-emitting element that are adjacent to each other,
- wherein the first light-emitting element comprises a first light-exiting surface, and the first light-exiting surface is located at a side of the first light-emitting element adjacent to the second light-emitting element, and
- wherein the second light-emitting element comprises a second light-exiting surface, and the second light-exiting surface is located at a side of the second light-emitting element adjacent to the first light-emitting element.

13. The display device according to claim 10, wherein the light-emitting element comprises an electrode connection surface, and the electrode connection surface comprises a connection electrode; and
- wherein the light-emitting element is electrically connected to the backlight driving circuit through the connection electrode, and an angle between the light-exiting surface and the electrode connection surface is equal to the angle θ.

14. The display device according to claim 13, wherein the light-emitting element comprises at least two light-exiting surfaces, and an angle is formed between two adjacent light-exiting surfaces of the at least two light-exiting surfaces.

15. The display device according to claim 10, further comprising a carrier layer located between the light-emitting element and the base, wherein the carrier layer comprises a recessed portion located at a side of the carrier layer away from the base, an angle between a surface of the recessed portion and the plane of the reflective layer is equal to the angle θ, and at least part of the light-emitting element is located within the recessed portion.

16. The display device according to claim 15, wherein the carrier layer comprises at least one of a first wire grid polarizer or a first diffusion layer.

17. The display panel according to claim 16, wherein the carrier layer comprises the first wire grid polarizer and the first diffusion layer, and the first wire grid polarizer is located at a side of the first diffusion layer away from the light-emitting element.

18. The display device according to claim 10, further comprising a second metal wire grid polarizer provided between the base and the display driving circuit.

19. A display device, comprising a backlight source, a reflective layer and a display panel,
- wherein the display panel comprises: a base comprising a first side and a second side oppositely arranged along a thickness direction of the base, a display driving circuit located at the first side of the base, and a backlight driving circuit located at the second side of the base, wherein the display driving circuit comprises a first thin film transistor, and the backlight driving circuit is configured to drive the backlight source to emit light and comprises a second thin film transistor,
- wherein the backlight source comprises a light-emitting element, the light-emitting element is electrically connected to the backlight driving circuit, and a light-exiting surface of the light-emitting element is located at a side of the light-emitting element away from the base;
- wherein the reflective layer is located at the side of the light-emitting element away from the base; and
- wherein the reflective layer comprises a plurality of microstructures provided at a side of the reflective layer adjacent to the light-emitting element.

20. The display device according to claim 19, wherein light emitted by the light-emitting element and incident on the plurality of microstructures is diffusely reflected by the plurality of microstructures.

* * * * *